United States Patent
Kuo et al.

(10) Patent No.: US 7,021,277 B2
(45) Date of Patent: Apr. 4, 2006

(54) VALVE AND FUELING STRATEGY FOR OPERATING A CONTROLLED AUTO-IGNITION FOUR-STROKE INTERNAL COMBUSTION ENGINE

(75) Inventors: Tang-Wei Kuo, Troy, MI (US); Barry L. Brown, Lake Orion, MI (US); Paul M. Najt, Bloomfield Hills, MI (US); James A. Eng, Troy, MI (US)

(73) Assignee: General Motors Corporation, Detroit, MI (US)

( * ) Notice: Subject to any disclaimer, the term of this patent is extended or adjusted under 35 U.S.C. 154(b) by 45 days.

(21) Appl. No.: 10/899,456

(22) Filed: Jul. 26, 2004

(65) Prior Publication Data

US 2006/0016422 A1 Jan. 26, 2006

(51) Int. Cl.
*F02B 3/04* (2006.01)
*F02M 25/07* (2006.01)

(52) U.S. Cl. .................. 123/299; 123/90.15; 123/295; 123/568.14

(58) Field of Classification Search .................. 123/21, 123/58.8, 64, 90.15, 90.16, 90.17, 90.18, 123/295, 299, 302, 305, 432, 478, 568.14
See application file for complete search history.

(56) References Cited

U.S. PATENT DOCUMENTS

| | | | |
|---|---|---|---|
| 4,446,830 A | 5/1984 | Simko et al. | |
| 4,722,315 A * | 2/1988 | Pickel | 123/568.14 |
| 5,224,460 A * | 7/1993 | Havstad et al. | 123/568.14 |
| 5,233,948 A * | 8/1993 | Boggs et al. | 123/64 |
| 5,713,328 A | 2/1998 | Anderson et al. | |
| 5,746,182 A | 5/1998 | Nada | |
| 5,927,238 A * | 7/1999 | Watson | 123/90.15 |
| 5,934,263 A * | 8/1999 | Russ et al. | 123/568.14 |
| 6,082,342 A * | 7/2000 | Duret et al. | 123/568.14 |
| 6,155,217 A | 12/2000 | Shiraishi et al. | |
| 6,286,478 B1 | 9/2001 | Atago et al. | |
| 6,336,436 B1 | 1/2002 | Miyakubo et al. | |
| 6,386,177 B1 * | 5/2002 | Urushihara et al. | 123/299 |
| 6,792,924 B1 * | 9/2004 | Aoyama et al. | 123/568.14 |
| 2005/0211219 A1 * | 9/2005 | Strom et al. | 123/299 |

FOREIGN PATENT DOCUMENTS

| | | |
|---|---|---|
| WO | WO 01/46571 A1 | 6/2001 |
| WO | WO 01/46573 A1 | 6/2001 |

* cited by examiner

*Primary Examiner*—Willis R. Wolfe, Jr.
(74) *Attorney, Agent, or Firm*—Kathryn A. Marra

(57) ABSTRACT

Part load operating point for a controlled auto-ignition four-stroke internal combustion engine is reduced without compromising combustion stability through load dependent valve controls and fueling strategies. Optimal fuel economy is achieved by employing negative valve overlap to trap and re-compress combusted gases below a predetermined engine load and employing exhaust gas re-breathing above the predetermined engine load. Split-injection fuel controls are implemented during low and intermediate part load operation whereas a single-injection fuel control is implemented during high part load operation. Split-injections are characterized by lean fuel/air ratios and single-injections are characterized by either lean or stoichiometric fuel/air ratios. Controlled autoignition is thereby enabled through an extended range of engine loads while maintaining acceptable combustion stability and emissions at optimal fuel economy.

32 Claims, 19 Drawing Sheets

VALVE AND FUELING STRATEGY FOR OPERATING A CONTROLLED AUTO-IGNITION FOUR-STROKE INTERNAL COMBUSTION ENGINE

TECHNICAL FIELD

The present invention is related to operating a four-stroke internal combustion engine.

BACKGROUND OF THE INVENTION

The automotive industry is continually researching new ways of improving the combustion process of the internal combustion engine in an effort to improve fuel economy, meet or exceed emission regulatory targets, and to meet or exceed consumer expectations regarding emissions, fuel economy and product differentiation.

Most modern conventional internal combustion engines attempt to operate around stoichiometric conditions. That is to say providing an optimal air/fuel ratio of substantially 14.6 to 1 that results in substantially complete consumption of the fuel and oxygen delivered to the engine. Such operation allows for exhaust gas aftertreatment by 3-way catalysts which clean up any unconsumed fuel (HC) and combustion byproducts such as NOx and CO. Most modern engines are fuel injected having either throttle body injection (TBI) or multi-port fuel injection (MPFI) wherein each of a plurality of injectors is located proximate an intake port at each cylinder of a multi-cylinder engine. Better air/fuel ratio control is achieved with a MPFI arrangement; however, conditions such as wall wetting and intake runner dynamics limit the precision with which such control is achieved. Fuel delivery precision can be improved by direct in-cylinder injection (DI). So called linear oxygen sensors provide a higher degree of control capability and, when coupled with DI, suggest an attractive system with improved cylinder-to-cylinder air/fuel ratio control capability. However, in-cylinder combustion dynamics then become more important and combustion quality plays an increasingly important role in controlling emissions. As such, engine manufacturers have concentrated on such things as injector spray patterns, intake swirl, and piston geometry to effect improved in-cylinder air/fuel mixing and homogeneity.

While stoichiometric gasoline four-stroke engine and 3-way catalyst systems have the potential to meet ultra-low emission targets, efficiency of such systems lags behind so-called lean-burn systems. Lean-burn systems also show promise in meeting emission targets for NOx through combustion controls, including high exhaust gas dilution and emerging NOx aftertreatment technologies. However, lean-burn systems still face other hurdles, for example, combustion quality and combustion stability particularly at part load operating points and high exhaust gas dilution.

Lean-burn engines, at a most basic level, include all internal combustion engines operated with air in excess of that required for the combustion of the fuel charge provided. A variety of fueling and ignition methodologies differentiate lean-burn topologies. Spark ignited systems (SI) initiate combustion by providing an electrical discharge in the combustion chamber. Compression ignition systems (CI) initiate combustion with combustion chamber conditions including combinations of air/fuel ratio, temperature and pressure among others. Fueling methods may include TBI, MPFI and DI. Homogeneous charge systems are characterized by very consistent and well vaporized fuel distribution within the air/fuel mixture as may be achieved by MPFI or direct injection early in the intake cycle. Stratified charge systems are characterized by less well vaporized and distributed fuel within the air/fuel mixture and are typically associated with direct injection of fuel late in the compression cycle.

Known gasoline DI engines may selectively be operated under homogeneous spark ignition or stratified spark ignition modes. A homogeneous spark ignited mode is generally selected for higher load conditions while a stratified spark ignition mode is generally selected for lower load conditions.

Certain DI compression ignition engines utilize a substantially homogeneous mixture of preheated air and fuel and establish pressure and temperature conditions during engine compression cycles that cause ignition without the necessity for additional spark energy. This process is sometimes called controlled auto-ignition. Controlled auto-ignition is a predictable process and thus differs from undesirable pre-ignition events sometimes associated with spark-ignition engines. Controlled auto-ignition also differs from well-known compression ignition in diesel engines wherein fuel ignites substantially immediately upon injection into a highly pre-compressed, high temperature charge of air, whereas in the controlled auto-ignition process the preheated air and fuel are mixed together prior to combustion during intake events and generally at compression profiles consistent with conventional spark ignited four-stroke engine systems.

Four-stroke internal combustion engines have been proposed which provide for auto-ignition by controlling the motion of the intake and exhaust valves associated with a combustion chamber to ensure that a air/fuel charge is mixed with combusted gases to generate conditions suitable for auto-ignition without the necessity for externally pre-heating intake air or cylinder charge or for high compression profiles. In this regard, certain engines have been proposed having a cam-actuated exhaust valve that is closed significantly later in the four-stroke cycle than is conventional in a spark-ignited four-stroke engine to allow for substantial overlap of the open exhaust valve with an open intake valve whereby previously expelled combusted gases are drawn back into the combustion chamber early during the intake cycle. Certain other engines have been proposed that have an exhaust valve that is closed significantly earlier in the exhaust cycle thereby trapping combusted gases for subsequent mixing with fuel and air during the intake cycle. In both such engines the exhaust and intake valves are opened only once in each four-stroke cycle. Certain other engines have been proposed having a hydraulically controlled exhaust valve that is opened twice during each four-stroke cycle—once to expel combusted gases from the combustion chamber into the exhaust passage during the exhaust cycle and once to draw back combusted gases from the exhaust passage into the combustion chamber late during the intake cycle. These engines variously utilize throttle body, port or direct combustion chamber fuel injection.

However advantageous such lean-burn engine systems appear to be, certain shortfalls with respect to combustion quality and combustion stability, particularly at part load operating points and high exhaust gas dilution, continue to exist. Such shortfalls lead to undesirable compromises including limitations on how much a fuel charge can effectively be reduced during part load operating points while still maintaining acceptable combustion quality and stability characteristics.

SUMMARY OF THE INVENTION

It is recognized that homogeneous air/fuel charges within a combustion chamber are generally desirable in a variety of internal combustion engines, including engines employing strategies such as TBI, MPFI, DI, SI, CI, controlled auto-ignition, stoichiometric, lean-burn and combinations and variants thereof. A lean-burn, four-stroke, internal combustion engine is generally desirable. Furthermore, such an engine exhibiting high combustion stability at part load operating points is desirable. Moreover, such an engine capable of extended lean operation into heretofore unattained part load operating point regions is desirable.

The present invention provides these and other desirable aspects in a method of operating a four-stroke internal combustion engine with extended capability at low engine loads while maintaining or improving combustion quality, combustion stability and engine out emissions.

In accordance with one aspect of the present invention, combusted gases are trapped and recompressed within the combustion chamber to establish therein elevated combustion chamber temperature and pressure conditions when the engine is operating below a predetermined part load. And, above the predetermined part load, combusted gases are recirculated into the combustion chamber.

In accordance with another aspect of the present invention, below the predetermined part load, injection of at least a portion of the total combustion cycle fuel requirement is initiated within the elevated temperature and pressure conditions. A second fuel injection initiated during one of the compression and intake cycles in accordance with low and intermediate part load, respectively. And, during high part load below the predetermined part load, the total combustion cycle fuel requirement is delivered pursuant to a single injection. Above the predetermined part load, injection of the total combustion cycle fuel requirement is initiated during the intake stroke.

In accordance with another aspect of the present invention, split-injections are characterized by a first injection timing that is retarded as engine load increases. Split-injection during low part load operation is further characterized by the second injection being advanced as engine load increases. Split-injection during intermediate part load operation is further characterized by the second injection being retarded as engine load increases. Single injections during high part load operation whether above or below the predetermined part load are characterized by being retarded as engine load increases.

In accordance with another aspect of the present invention, recirculation of combusted gases into the combustion chamber above the predetermined part load is accomplished by one of combusted gases being internally or externally recirculated. Internal recirculation may be effected by early closing of the exhaust valve or by re-breathing expelled combusted gases.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
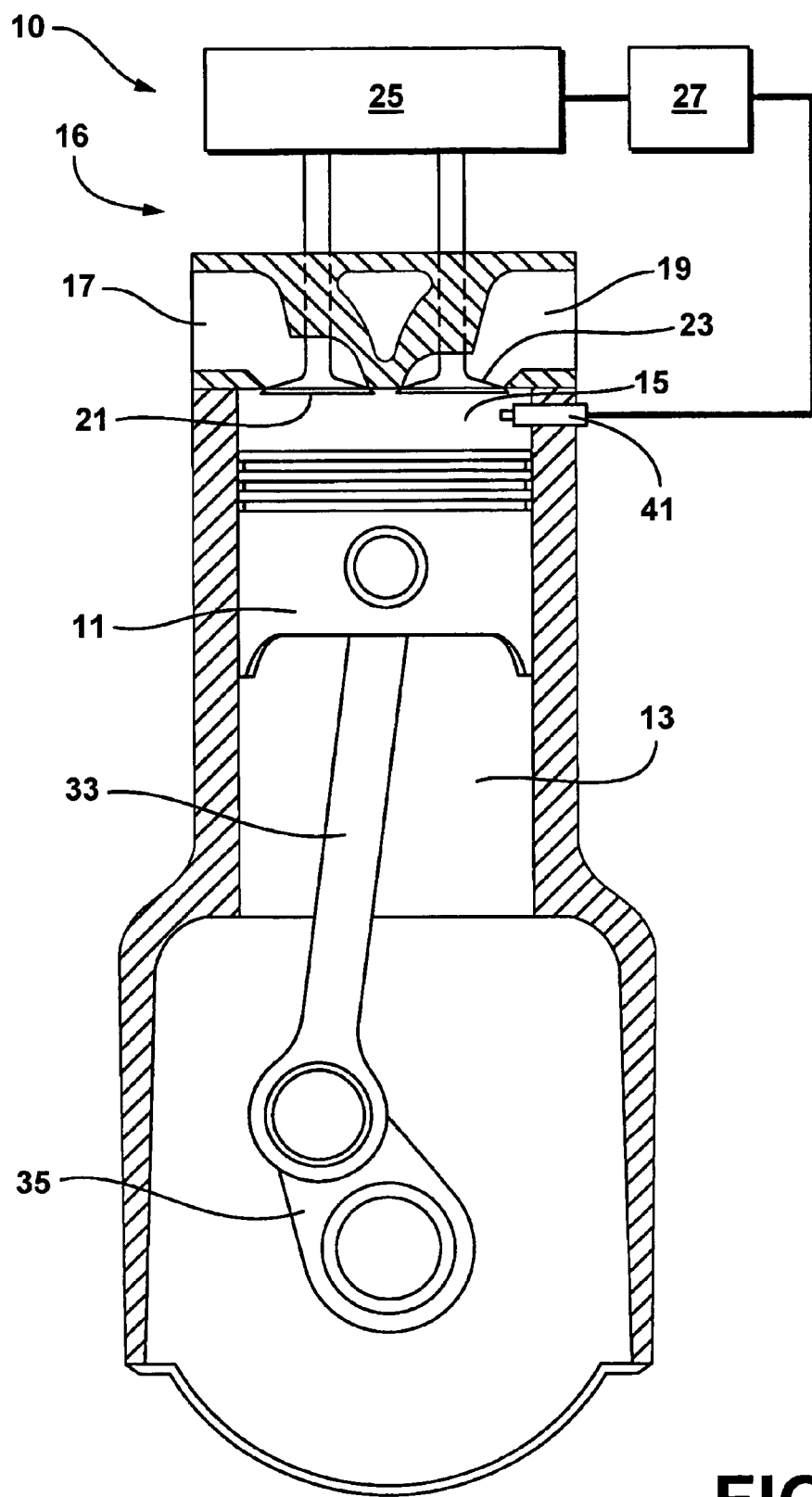
FIG. 1 is a schematic illustration of a single cylinder, direct-injection, four-stroke internal combustion engine in accordance with the present invention.

With reference first to FIG. 1, an exemplary single cylinder four-stroke internal combustion engine system (engine) 10 suited for implementation of the present invention is schematically illustrated. It is to be appreciated that the present invention is equally applicable to a multi-cylinder four-stroke internal combustion engine. The present exemplary engine 10 is shown configured for direct combustion chamber injection (direct injection) of fuel vis-à-vis fuel injector 41. Alternative fueling strategies including port fuel injection or throttle body fuel injection may also be used in conjunction with certain aspects of the present invention; however, the preferred approach is direct injection. Similarly, while widely available grades of gasoline and light ethanol blends thereof are preferred fuels, alternative liquid and gaseous fuels such as higher ethanol blends (e.g. E80, E85), neat ethanol (E99), neat methanol (M100), natural gas, hydrogen, biogas, various reformates, syngases etc. may also be used in the implementation of the present invention.

With respect to the base engine, a piston 11 is movable in a cylinder 13 and defines therein a variable volume combustion chamber 15. Piston 11 is connected to crankshaft 35 through connecting rod 33 and reciprocally drives or is reciprocally driven by crankshaft 35. Engine 10 also includes valve train 16 illustrated with a single intake valve 21 and a single exhaust valve 23, though multiple intake and exhaust valve variations are equally applicable for utilization with the present invention. Valve train 16 also includes valve actuation means 25 which may take any of a variety of forms including, preferably, electrically controlled hydraulic or electromechanical actuation (a.k.a. fully flexible valve actuation, FFVA). Alternative valve actuation means adaptable for implementation in conjunction with the present invention include multi-profile cams (a.k.a. multi-lobe, multi-step) and selection mechanisms, cam phasers and other mechanically variable valve actuation technologies implemented individually or in combination. Intake passage 17 supplies air into the combustion chamber 15. The flow of the air into the combustion chamber 15 is controlled by intake valve 21 during intake events. Combusted gases are expelled from the combustion chamber 15 through exhaust passage 19 with flow controlled by exhaust valve 23 during exhaust events.

Engine control is provided by computer based control 27 which may take the form of conventional hardware configurations and combinations including powertrain controllers, engine controllers and digital signal processors in integrated or distributed architectures. In general, control 27 includes at least one microprocessor, ROM, RAM, and various I/O devices including A/D and D/A converters and power drive circuitry. Control 27 also specifically includes controls for valve actuation means 25 and fuel injector 41. Controller 27 includes the monitoring of a plurality of engine related inputs from a plurality of transduced sources including engine coolant temperature, outside air temperature, manifold air temperature, operator torque requests, ambient pressure, manifold pressure in throttled applications, displacement and position sensors such as for valve train and engine crankshaft quantities, and further includes the generation of control commands for a variety of actuators as well as the performance of general diagnostic functions. While illustrated and described as integral with controller 27, the control and power electronics associated with valve actuation means 25 and fuel injector 41 may be incorporated as part of distributed smart actuation scheme wherein certain monitoring and control functionality related to respective subsystems are implemented by programmable distributed controllers associated with such respective valve and fuel control subsystems.

Figure 2:
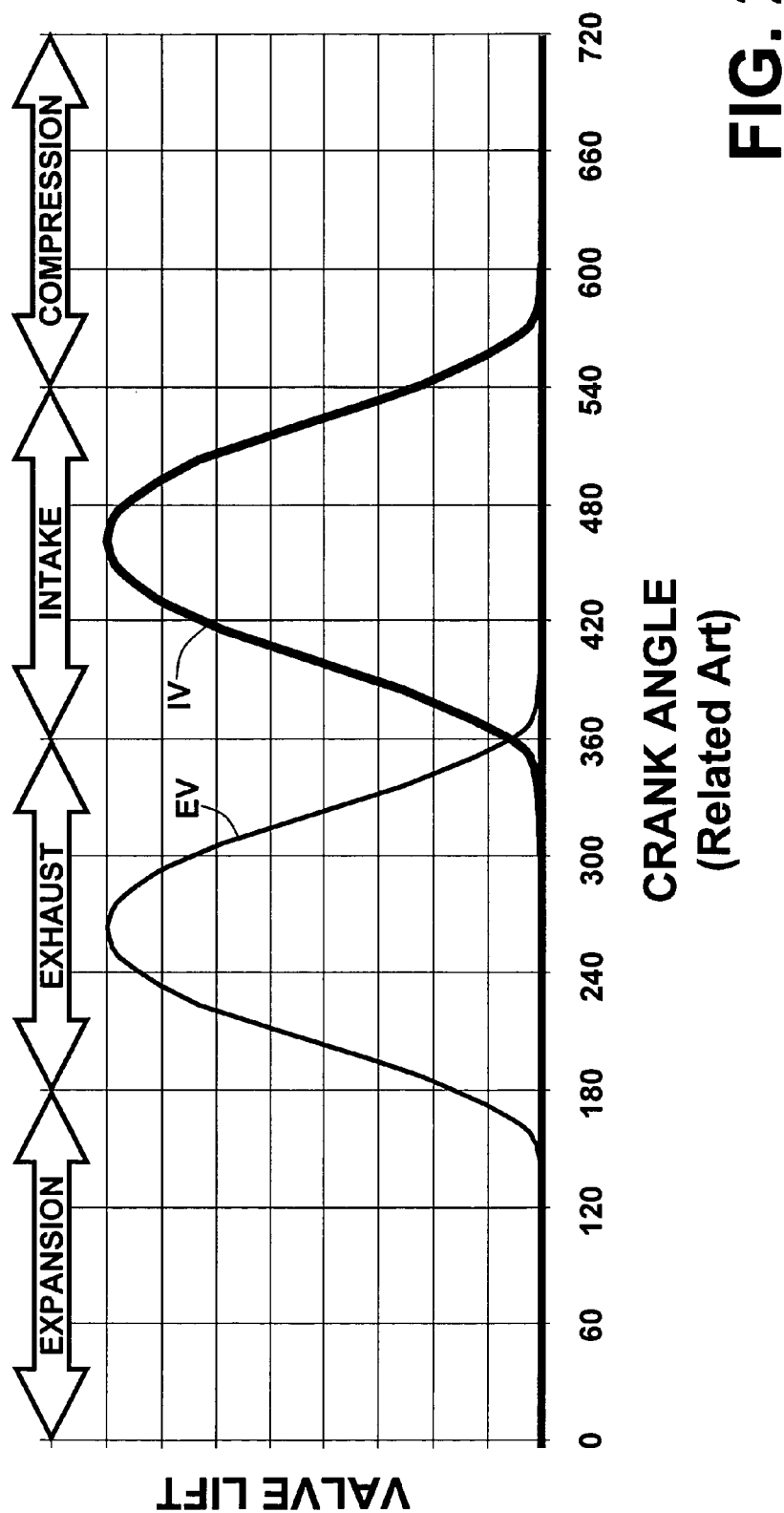
FIG. 2 illustrates valve lift versus crank angle curves corresponding to related art exhaust and intake valve phasing of a conventional spark-ignited, internal combustion engine.
Figure 3:
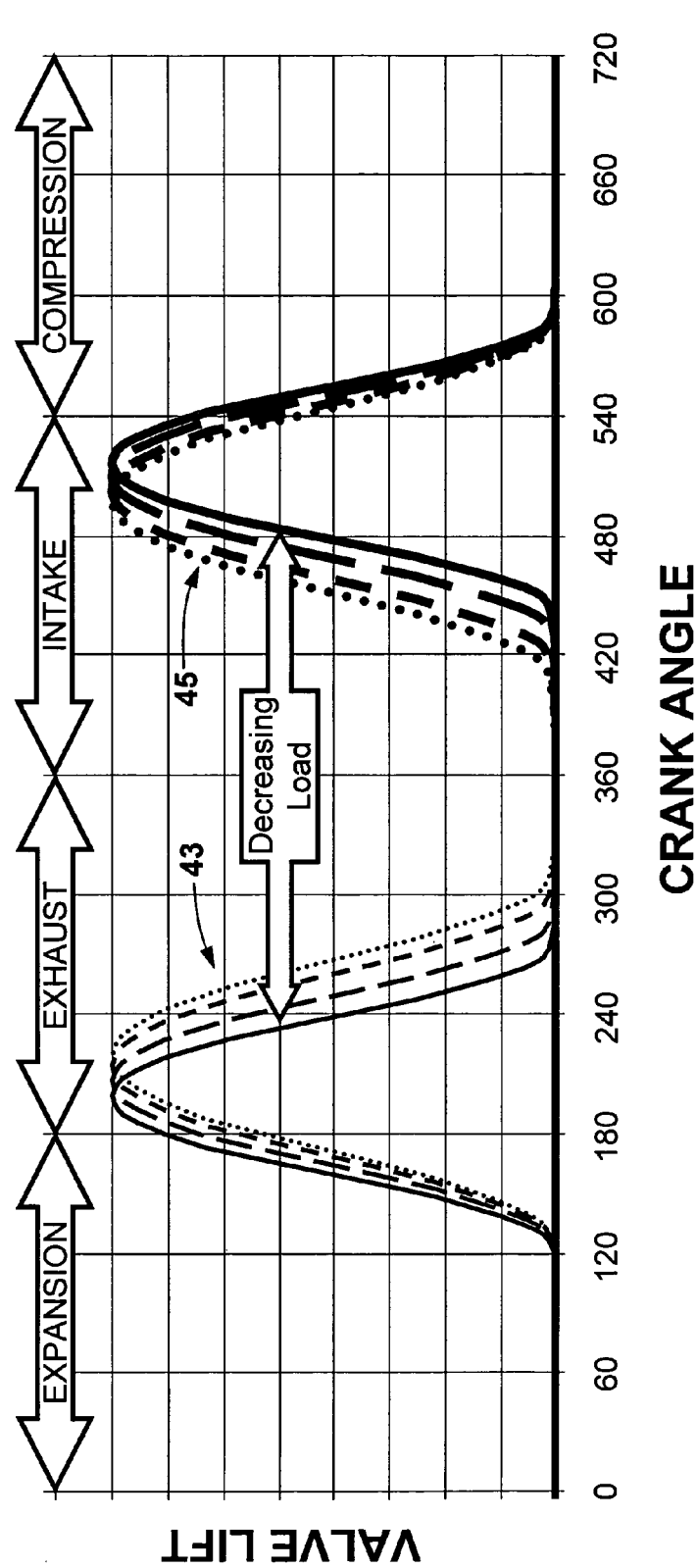
FIG. 3 illustrates various exhaust and intake valve phase and lift versus crank angle curves and preferred trend correspondence to engine load corresponding to the single cylinder engine of FIG. 1 with fully flexible valve actuation for effecting desired in cylinder conditions in accordance with the present invention.

Having thus described the environment and certain application hardware suitable for implementing the present invention, attention is now directed toward FIGS. 2–19. In FIG. 2, conventional or baseline spark-ignited internal combustion engine valve lifts of the intake and exhaust valves are plotted against a complete four-stroke combustion cycle. In this and subsequent figures, exhaust valve schedules (EV) are illustrated with narrow lines whereas intake valve schedules (IV) are illustrated with thick lines. A full 720 degrees or two revolutions of the crankshaft are plotted against the horizontal axis beginning at 0 degrees corresponding to top dead center (TDC) combustion (i.e. position of the piston at the beginning of the expansion stroke (end of the compression stroke), and ending at 720 degrees corresponding to the same top dead center position at the end of the compression stroke (beginning of the expansion stroke). By convention and as followed herein, the crankshaft angular positions 0 through 720 refer to degrees of crankshaft rotation ATDC combustion. The sequentially repeated cycles are delineated across the top of the figure within double-ended arrows labeled EXPANSION, EXHAUST, INTAKE and COMPRESSION. Each of these cycles correspond to the piston motion between respective ones of top dead and bottom dead center positions and covers a full 180 degrees of crankshaft rotation or one-quarter of the complete four-stroke cycle.

In the present exemplary exposition of the invention, a four-stroke, single cylinder, 0.55 liter, controlled auto-ignition, gasoline direct injection fueled internal combustion engine was utilized in implementing the valve and fueling controls and acquisition of the various data embodied herein. Unless specifically discussed otherwise, all such implementations and acquisitions are assumed to be carried out under standard conditions as understood by one having ordinary skill in the art.

In accordance with certain valve control aspects of the present invention, during part load operation of the engine a high pressure event is established within the combustion chamber, preferably by means of FFVA advancing the closure of the exhaust valve and, preferably, retarding the opening of the intake valve. The advance of the exhaust valve closure creates a negative valve overlap during which both of the exhaust and intake valves are closed. The advanced closure of the exhaust valve also effects an internal recirculation of combusted gases by retaining or trapping a portion thereof within the combustion chamber. This trapped exhaust gas is then re-compressed for the remainder of the piston stroke during the exhaust cycle. As used herein, part load operation corresponds to engine load below mid-load of about 450 kPa net mean effective pressure. Low part load as used herein corresponds to engine load below about 125 kPa net mean effective pressure. Intermediate part load as used herein corresponds to engine load from about 125 to about 200 kPa net mean effective pressure. And, high part load as used herein corresponds to engine load from about 200 to about 450 kPa net mean effective pressure. In the present example illustrated in FIG. 3, it is assumed that an exhaust event is caused to occur wherein the exhaust valve is opened for at least a portion of the exhaust stroke from 180 to 360 degrees. The actual opening and closing angles of the exhaust valve during an exhaust event will vary in accordance with such factors as engine speed or load and exhaust runner geometries as well as other desired engine tuning characteristics. In the present illustrated example the exhaust valve opening is assumed to correspond substantially just after 120 degrees ATDC combustion as illustrated in each of the individual curves comprising the exhaust schedule 43. The closing timing of the exhaust valve is seen to vary, however, as a function of the engine load as indicated by the decreasing load arrow central in the figure. During part load operation, the lower the engine load goes, the more advanced is the exhaust valve closing timing. Thus, it is generally true that decreasing loads will result in increased combusted gas trapping and higher compressions thereof. The higher pressures and temperatures effected by the valve control provides an in-cylinder environment that conducive to partial reformation of fuel injected therein, which reformation and subsequent dispersal of reformate within the combustion chamber enables controlled auto-ignition. The desired trending of increases in trapped combusted gases and increases in pressures and temperatures with decreases in engine operating loads provides for optimal auto-ignition combustion phasing throughout the part load region of engine operation. A generally symmetrical and directionally opposite phasing of the intake valve opening timing is effected also as illustrated in each of the individual curves comprising the intake schedule 45. Relaxation of the high pressure within the combustion chamber is effected thereby and returns the stored energy of the compressed gas back to the piston and engine crankshaft.

The FFVA control of intake and exhaust valves to establish trapped combusted gas and pressure conditions within the combustion chamber are carried out to establish in-cylinder gas, pressure and temperature trends as a function of engine load which are not found in conventional known four-stroke operation.

The preferred fueling methodology for an engine operated as set forth herein above will now be described. Liquid and gaseous injections are candidates for DI. Additionally, it is contemplated that air assisted and other types of delivery may be employed. Also, the type of ignition system employable is variable—generally in accordance with engine load and knock considerations—and includes such non-limiting examples as SI, CI, and controlled auto-ignition.

Figure 4:
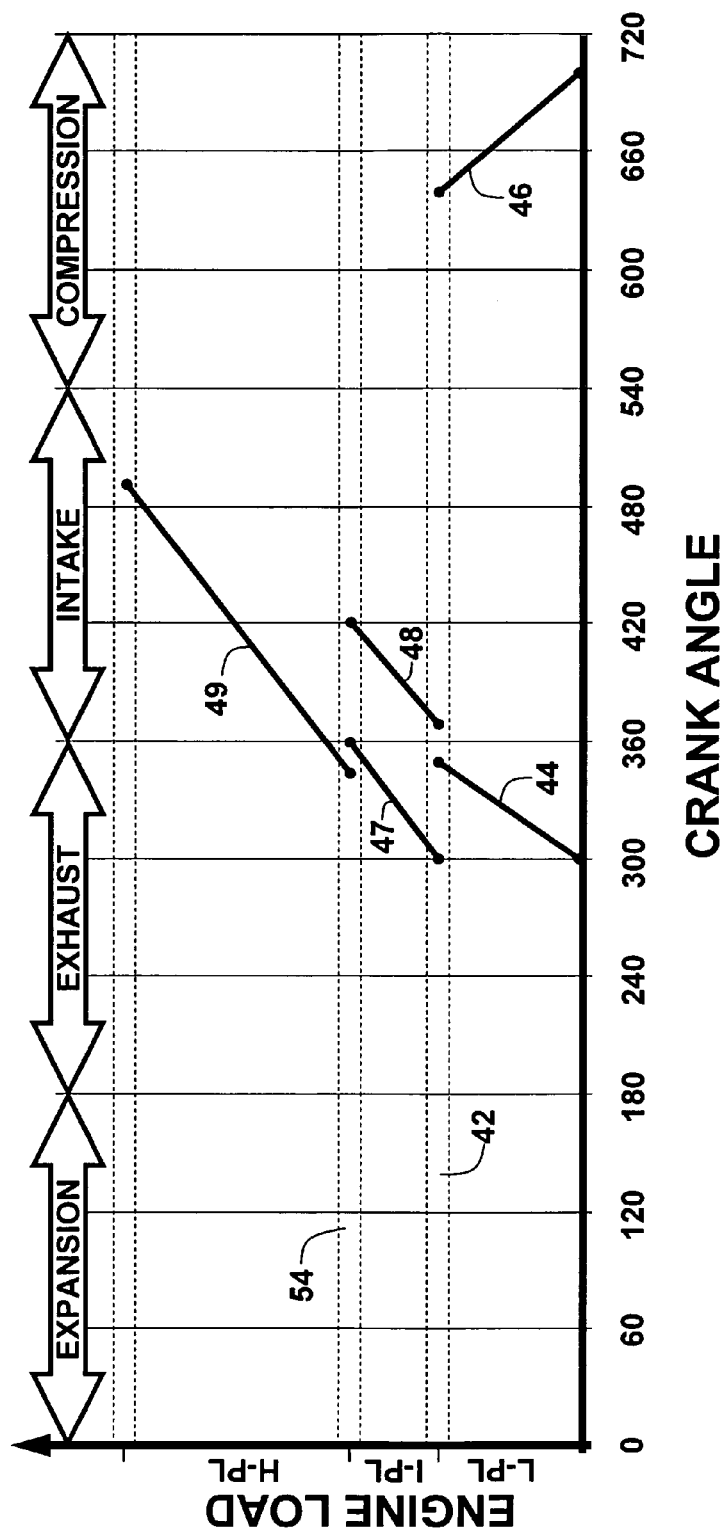
FIG. 4 illustrates part-load operating regions and exemplary fuel injection timing schedules corresponding thereto in accordance with exhaust gas trapping/re-compression aspects of the present invention.

In accordance with the fueling control aspects of the present invention, three general load regions within the part load operating region of the engine are delineated. With reference to FIG. 4, low part load region is labeled L-PL, intermediate part load region is labeled I-PL and high part load region is labeled H-PL. These regions are plotted against a complete four-stroke combustion cycle delineated variously by crank angle ATDC combustion at the bottom and corresponding sequentially repeated combustion cycle regions at the top. Generally, in the low and intermediate part load regions, split-injection of the total fuel charge is caused to occur whereas in the high part load region a single-injection of the total fuel charge is caused to occur. There are illustrated in the figure transition regions 42 and 54 which may significantly overlap one or both respectively adjacent part load regions effectively extending part load regions for corresponding fuel controls.

With split-injection, the total fuel requirement for the cycle is divided into two injection events. In the low part load operating region (L-PL), one of the injection events is carried out late in the exhaust cycle while the other injection event is carried out late in the compression cycle. Generally, the first fueling event injects about 10 to about 50 percent of the total fuel requirement for the cycle. Generally, the cylinder charge established by this first fraction of fuel is insufficient for auto-ignition within the combustion chamber. The remainder of the fuel requirement for the cycle is injected during the second fueling event. This second fraction of fuel enriches the cylinder charge during a compression stroke of the piston sufficient to cause auto-ignition at low part loads.

Penetration and dispersion of the second fuel spray are suppressed due to higher in-cylinder charge temperature and density. A localized rich mixture region is formed in the combustion chamber. The mixture of air, trapped combusted gas, and fuel from first fuel injection works in conjunction with the localized rich mixture formed by the second fuel injection to accomplish the auto-ignition of gasoline under a relatively low compression ratio without any help of spark as compared to a relatively high compression ratio used in the auto-ignition of diesel fuel.

In the intermediate part load operating region (I-PL), one of the injection events is similarly carried out late in the exhaust cycle. However, the other injection event is carried out early in the intake cycle. Generally, the first fueling event injects about 10 to about 50 percent of the total fuel requirement for the cycle. Generally, the cylinder charge established by this first fraction of fuel is insufficient for auto-ignition within the combustion chamber but provides the seed charge of fuel and reformate critical to auto-ignition. The remainder of the fuel requirement for the cycle is injected during the second fueling event. This second fraction of fuel enriches the cylinder charge during the intake stroke of the piston sufficient to cause auto-ignition at intermediate part loads.

Penetration and dispersion of the second fuel spray are initially suppressed due to higher in-cylinder charge temperature, density and first injected fuel. However, the relaxing in-cylinder pressure and subsequent fresh air ingestion and turbulence during the intake cycle provide conditions for substantial dispersal and homogeneity of the cylinder mixture. This homogeneous mixture of air, retained combusted gas, and fuel work in conjunction to accomplish the auto-ignition of gasoline under a relatively low compression ratio without any help of spark as compared to a relatively high compression ratio used in the auto-ignition of diesel fuel.

The total fueling requirement (i.e. the combined first and second fuel fractions) for both low part load and intermediate part load split-injection strategies is significantly less than the fueling requirement of a similar conventionally operated internal combustion engine as determined against such common metrics as combustion stability as will be demonstrated later with respect to FIGS. 10 and 11.

In the high part load operating region (H-PL), a single injection of fuel is performed. With the single-injection, the total fuel requirement for the cycle is consolidated in one injection event carried out during the negative valve overlap.

FIG. 4 is also demonstrative of certain preferences regarding injection timing. The region delimited by the solid lines labeled 44 and 46 correspond to preferred angular regions within the exhaust and compression cycles for delivery of the first fueling event and second fueling event, respectively, for the low part load operating region. Preferably, the first fraction of fuel is injected about 300 to about 350 degrees ATDC combustion. The injection timing for the first injection also preferably retards in a continuous manner as the engine load increases as shown in the figure. And the second fraction of fuel is injected about 640 to about 695 degrees ATDC combustion (25 to 80 degrees before top dead center combustion). This injection timing is chosen to ensure smoke-free operation and is affected by the injector spray cone angle and the amount of fuel injected. The injection timing for the second injection also preferably advances in a continuous manner as the engine load increases. Other angular regions for the split-injection injection may be utilized but may not yield as substantial an advantage as the preferred regions.

The region delimited by the solid lines labeled 47 and 48 correspond to preferred angular regions within the exhaust and intake cycles for delivery of the first fueling event and second fueling event, respectively, for the intermediate part load operating region. Preferably, the first fraction of fuel is injected about 300 to about 360 degrees ATDC combustion. The injection timing for the first injection also preferably retards in a continuous manner as the engine load increases as shown in the figure. This injection timing is chosen to ensure smoke-free operation (e.g. avoidance of fuel spray on rising piston), provide sufficient fuel quantity and resident time for adequate reformation, and is affected by the injector spray cone angle and the amount of fuel injected. The second fraction of fuel is injected about 30 to about 60 degrees after the end of the first injection. The injection timing for the second injection also preferably retards in a continuous manner as the engine load increases. Both intermediate injections are accomplished within the negative overlap region of the exhaust and intake valves. Other angular regions for the split-injection injection may be utilized but may not yield as substantial an advantage as the preferred regions.

The region delimited by the solid line labeled 49 corresponds to a preferred angular region for delivery of the fuel for the high part load operating region. Preferably, this fuel is injected about 340 to about 490 degrees ATDC combustion. The injection timing for the single-injection also preferably retards in a continuous manner as the engine load increases as shown in the figure. Other angular regions for the single-injection may be utilized but may not yield as substantial an advantage as the preferred regions.

Transition from one injection strategy to another during load change is regulated by both engine performance and emissions. For example, during operation with low part load, split-injection with first injection during the negative valve overlap period and second injection during compression stroke is the only injection strategy capable of generating stable controlled auto-ignition combustion. The injection timing for the second injection is advanced continuously with increasing engine load to promote dispersion of fuel within the combustion chamber and to keep the air/fuel ratio of the localized mixture within an acceptable range to avoid unacceptable levels of NOx and smoke emissions. However, even with the advanced injection timing, formation of nitrogen oxides (NOx) can still rise to unacceptable level during operation with intermediate part load. Thus, the injection strategy is switched from split-injection with second compression cycle injection to split-injection with second intake cycle injection. Experiments confirm that both split-injection strategies result in similar engine performance during intermediate part load engine operation. Comparative NOx emissions may be significantly less with split-injections using a second injection during the intake stroke than with split-injections using a second injection during the compression stroke. Comparative hydrocarbon (HC) emissions, however, are greater with split-injections using a second injection during the intake stroke due to increases in crevice-trapped fuel that escapes combustion than with split-injections using a second injection during the compression stroke. Therefore, the exact load where the low part load split-injection and intermediate load split-injection transition takes place will be determined by NOx-HC emissions tradeoff. Similar considerations define criteria used to establish transition from the intermediate part load split-injection strategy to the high part load single-injection strategy (e.g. NOx-HC emissions tradeoff).

Figure 5:
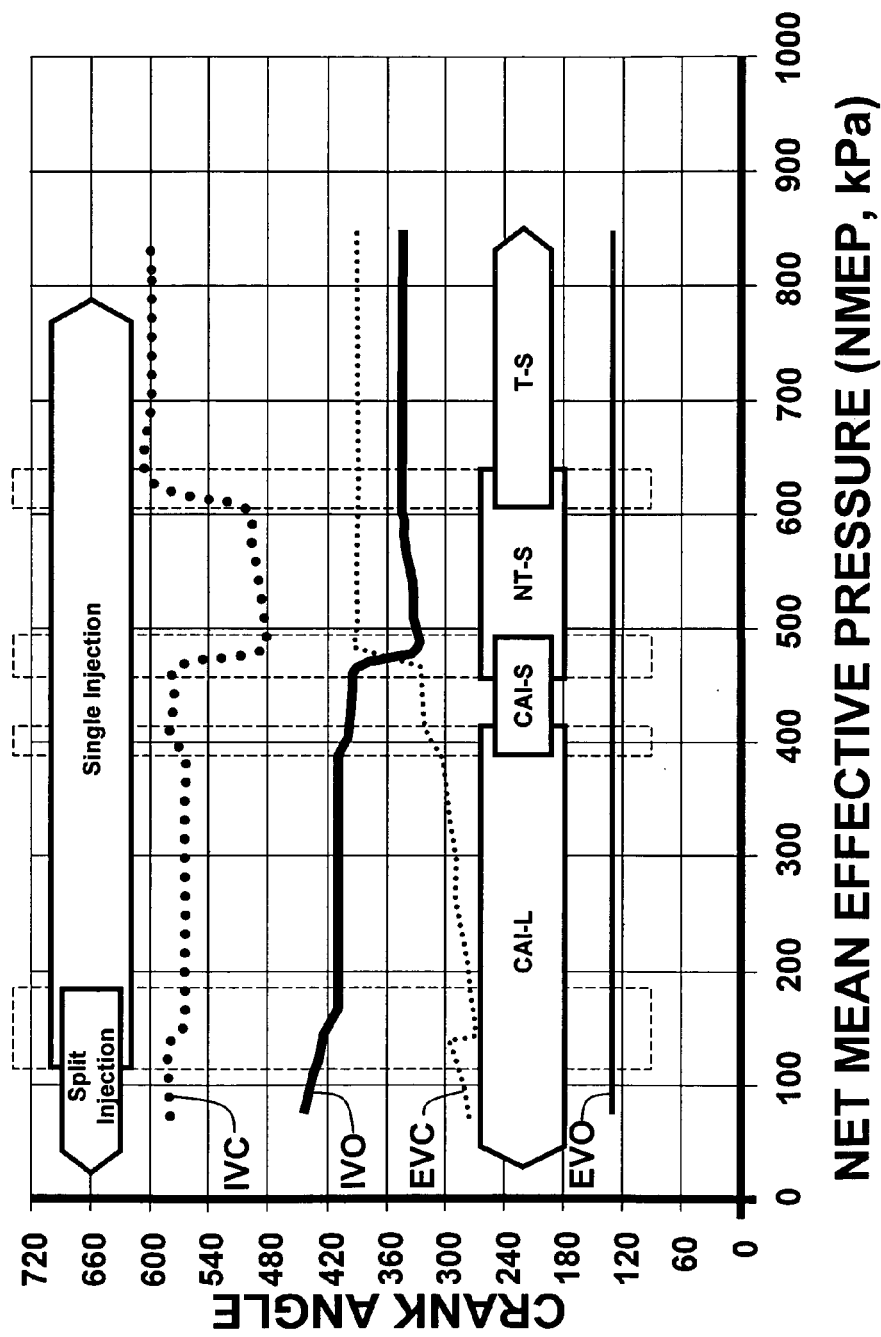
FIG. 5 illustrates exemplary valve timing effected by fully flexible valve actuation, fuel injection strategies and combustion modes versus part load regions of engine operation in accordance with the present invention.

FIG. 5 shows exemplary opening and closing valve timings as a function of engine load for the exhaust and intake valves of a four-stroke internal combustion engine operating in accordance with the present invention using a FFVA system. Therein, the following labeling is used: intake valve opening (IVO); intake valve closing (IVC); exhaust valve opening (EVO); exhaust valve closing (EVC). Also shown in FIG. 5 are the load dependent injection strategies and various combustion modes as a function of engine load in accordance with the present invention. In particular, the engine is operated in controlled auto-ignition combustion mode with lean air/fuel mixture (CAI-L) below about 400 kPa NMEP. During this combustion mode, the NOx emission index increases with increasing engine load. At about 400 kPa NMEP, the NOx emission index is around 1 g/kg fuel. Between about 400 and about 480 kPa NMEP, the engine is operated in controlled auto-ignition combustion mode with stoichiometric air/fuel ratio (CAI-S) to allow the use of traditional 3-way catalyst after treatment for NOx control. Between about 480 and about 620 kPa NMEP, the engine is operated in spark-ignition, non-throttled combustion mode with stoichiometric air/fuel mixture (NT-S) using early intake valve closing for load control. Beyond about 620 kPa NMEP, the engine is operated in traditional spark-ignition, throttled combustion mode with stoichiometric air/fuel mixture (T-S) until reaching full load.

Additional details respecting combustion gas trapping and recompression valve and fuel controls for controlled auto-ignition are found in commonly assigned and co-pending U.S. patent application Ser. No. 10/899,945, the contents of which are incorporated herein by reference.

In accordance with certain other valve control aspects of the present invention, during part load operation of the engine a low pressure event is established within the combustion chamber, preferably by means of FFVA controlling the opening and closing of one or more of the intake and exhaust valves. In the present example illustrated in FIG. 6, it is assumed that an exhaust event is caused to occur wherein the exhaust valve is opened for at least a portion of the exhaust stroke from 180 to 360 degrees. The actual opening and closing angles of the exhaust valve during an exhaust event will vary in accordance with such factors as engine speed or load and exhaust runner geometries as well as other desired engine tuning characteristics. In the present illustrated example the exhaust valve closure is assumed to correspond substantially to 380 degrees ATDC combustion or 20 degrees after exhaust stroke TDC. Preferably, the exhaust valve closure occurs within approximately 20 degrees before exhaust stroke TDC to 20 degrees after exhaust stroke TDC. It is generally believed that maximum expulsion of exhaust gases from the combustion chamber will aid in minimizing residual cylinder pressure and such condition is generally consistent with effectuating deeper and longer duration low pressure events. Through certain gas dynamics under certain conditions, maximum expulsion occurs when the exhaust valve remains open for some angle after exhaust stroke TDC. More preferably, then, the exhaust valve closure occurs within approximately exhaust stroke TDC to 20 degrees after exhaust stroke TDC, particularly at the lowest engine loads whereat lower in cylinder pressure conditions are desired in accordance with the present invention.

Consistent with the objective of establishing a low pressure event within the combustion chamber during the intake stroke it may further be desirable that the exhaust event exhaust valve closure absolute phase before exhaust stroke TDC is not greater than the intake valve opening phase after exhaust stroke TDC, or that minimal valve overlap exists. Generally a certain degree of asymmetry around exhaust stroke TDC as between exhaust valve closure and intake valve opening as described is required in order to establish the desired low pressure conditions within the combustion chamber. If exhaust event exhaust valve closure occurs before exhaust stroke TDC, then it may be desirable to allow at least a similar angle after TDC for the pressure in the combustion chamber to relax before the intake valve begins to open. Preferably, the intake valve opening during an intake event follows the exhaust valve closing at about 30 to about 90 degrees after exhaust stroke TDC at low part load operating points.

Figure 6:
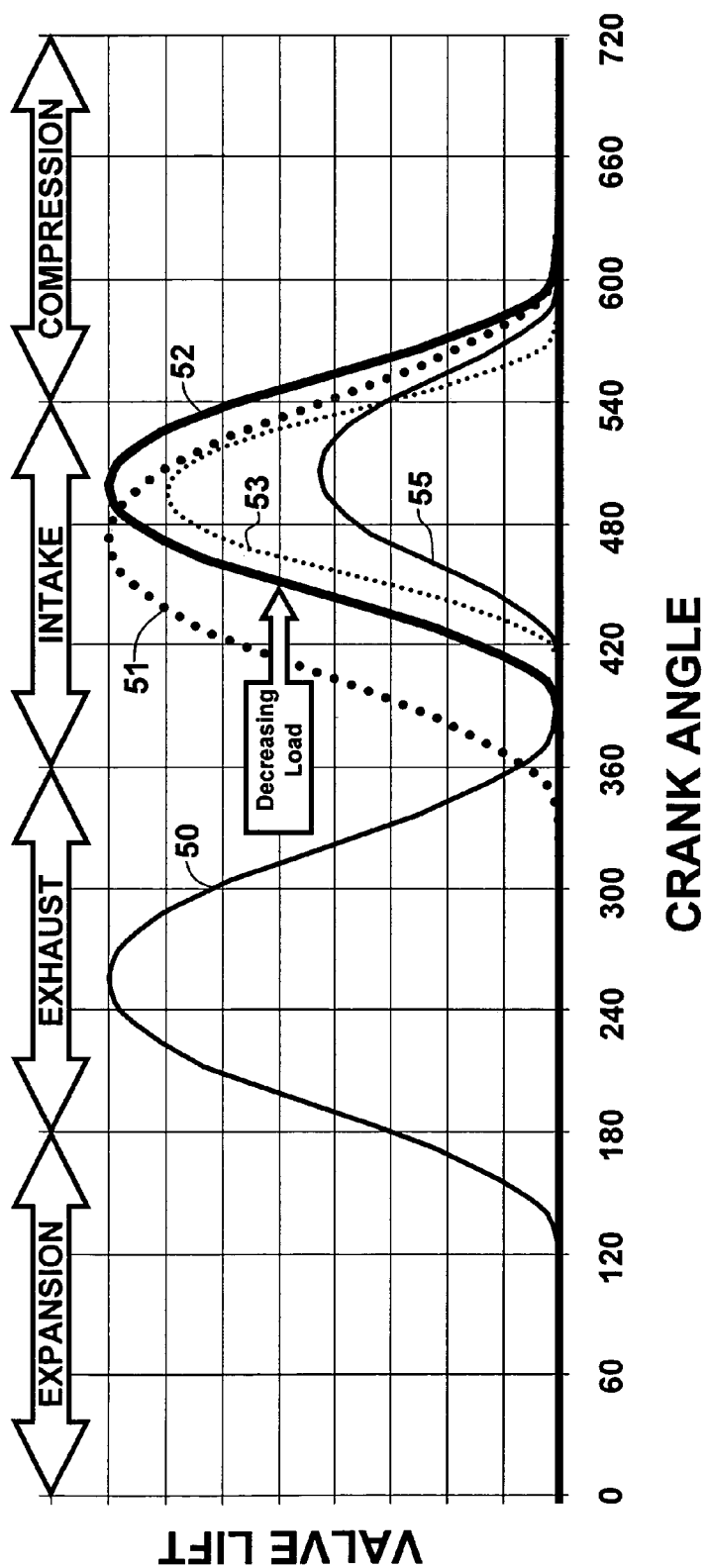
FIG. 6 illustrates various exhaust and intake valve phase and lift versus crank angle curves and preferred trend correspondence to engine load corresponding to the single cylinder engine of FIG. 1 with fully flexible valve actuation for effecting desired in cylinder conditions in accordance with the present invention.

The general and preferred characteristics of intake and exhaust valve phasings heretofore described are substantially set forth in the exemplary curves illustrated in FIG. 6. Exhaust profile 50 represents an exhaust event exhaust valve profile wherein valve closure occurs at substantially 20 degrees after exhaust stroke TDC. For purposes of exposition it is assumed that the exhaust event is substantially static with respect to exhaust event exhaust valve closure phasing although, as described previously, it is contemplated that phase shifting of the exhaust valve closure is within the scope of the invention in attaining various outcomes and objectives thereof. Intake profile 52 corresponds to intake valve opening at substantially 40 degree after exhaust stroke top dead center and closing at substantially 70 degrees after intake stroke bottom dead center to effect one level of in cylinder vacuum. Intake profile 51 corresponds to an earlier intake valve opening at substantially 20 degrees before exhaust stroke top dead center and closing at substantially 70 degrees after intake stroke bottom dead center to effect a lesser in cylinder vacuum. In accordance with the present invention, lower in cylinder pressures are desirably effected at lower engine loads. That is to say, deeper vacuum levels are achieved at lower engine loads. Hence, to effect this trend, as engine load decreases, intake valve opening phase trends in the direction indicated by the decreasing load arrow central to FIG. 6. With the exemplary FFVA implementation, the intake valve closing phase can be maintained substantially static as illustrated in FIG. 6 at about 610 degrees ATDC combustion.

If a continuum of such intake profiles were plotted in the figure with intake valve opening limits at less retarded and more retarded phase angles, the result would be varying vacuum levels and durations thereof within the combustion chamber. Of course, in addition to the various low pressure profiles within the combustion chamber which can be achieved with simply phase shifting valve openings as described, additional pressure profiles may be achieved through more complex and independent variations of the exhaust and intake profiles including by way of lift variation in addition to timing. Additional details respecting varying vacuum levels is set forth in additional detail in commonly assigned and co-pending U.S. patent application Ser. Nos. 10/611,845, 10/611,366, and 10/899,443, the contents of which are incorporated herein by reference.

Figure 7:
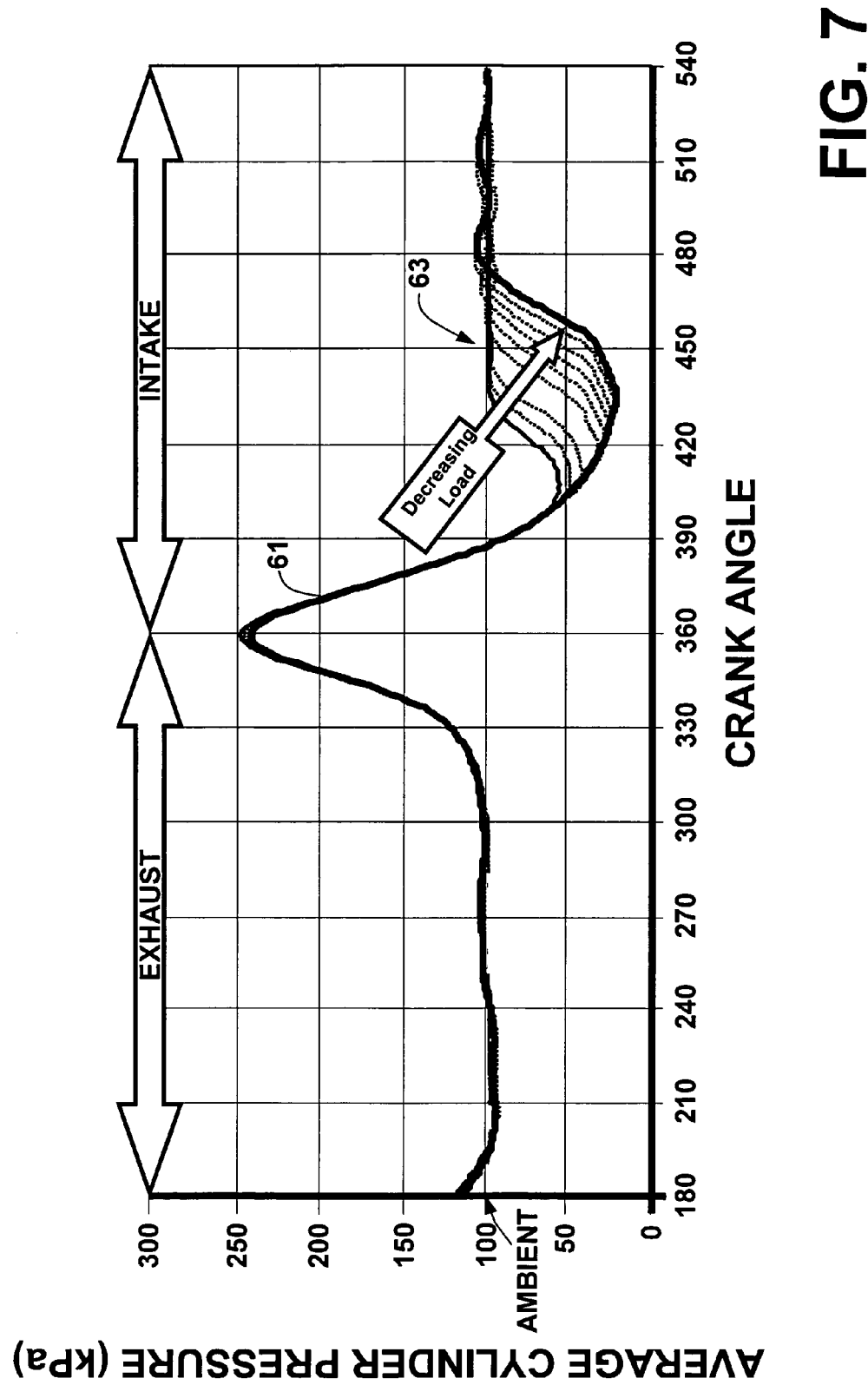
FIG. 7 illustrates various cylinder pressure versus crank angle curves and preferred trend correspondence to engine load for effecting desired in cylinder conditions in accordance with the present invention.

The FFVA control of intake and exhaust valves to establish low pressure event within the combustion chamber is carried out to establish pressure level depressions and durations thereof within the combustion chamber that are not found in conventional known four-stroke operation. With additional reference now to FIG. 7, a pressure profile corresponding to the exemplary load dependent intake valve profile trend described with respect to FIG. 6 is illustrated. Therein, a curve is generally designated by the numeral 61 and is illustrated with respect to only the 360 degrees of crankshaft rotation through the exhaust and intake strokes of the complete four-stroke process as delineated across the top of the figure within double-ended arrows labeled EXHAUST and INTAKE. Cylinder pressure is illustrated on a linear scale along the vertical axis with ambient pressure being specifically labeled and assumed to be substantially one standard atmosphere or about 101 kPa. Region 63 generally designates the area of resultant low pressure events or sub-atmospheric pressure conditions established in accordance with the present invention. A moderately deep and lasting duration low pressure event reaches substantially 60 kPa below ambient or sub-atmospheric or, alternatively stated, about 60% below ambient or atmospheric or about 40% of ambient or atmospheric. The specific curves illustrated in FIG. 7 are, of course, exemplary with other such curves and profiles being able to be established by virtue of more complex and independent variations of the exhaust and intake profiles including by way of lift variation in addition to timing and duration. For example, relative to the specific curve 52 illustrated in FIG. 6, further retarding the intake valve opening during intake events would effectuate deeper low pressure events whereas further advancing the intake valve opening during intake events would effectuate shallower low pressure events. An exemplary, relatively shallow and limited duration low pressure event reaches substantially 42 kPa below ambient or sub-atmospheric or alternatively stated about 42% below ambient or atmospheric or about 58% of ambient or atmospheric. An exemplary, relatively deep and lasting duration low pressure event reaches substantially 75 kPa below ambient or sub-atmospheric or alternatively stated about 75% below ambient or atmospheric or about 25% of ambient or atmospheric. As previously described with respect to FIG. 6, lower in cylinder pressures are desirably effected at lower engine loads. That is to say, deeper vacuum levels are achieved at lower engine loads. The decreasing load arrow of FIG. 7 illustrates the desired controlled trend of intake pressure profiles as a function of decreasing engine load.

Recirculated exhaust gases are desirably introduced into the combustion chamber for mixing with air and fuel. With reference once again to the valve schedules exhibited in FIG. 6, the FFVA enables an exhaust re-breathe exhaust valve actuation with flexibility in valve opening, closing, lift and duration to re-ingest combusted gases previously expelled into the exhaust passage through the exhaust valve. FFVA allows for significant variations in gas constituent mixtures and temperatures in an exhaust re-breathe implementation. Exemplary re-breathe schedules illustrating the variations in lift, duration and phasing are labeled 53 and 55 in FIG. 6.

The preferred fueling methodology for an engine operated as set forth herein above will now be described. Liquid and gaseous injections are candidates for DI. Additionally, it is contemplated that air assisted and other types of delivery may be employed. Also, the type of ignition system employable is variable—generally in accordance with engine load and knock considerations—and includes such non-limiting examples as SI, CI, and controlled auto-ignition.

Figure 8:
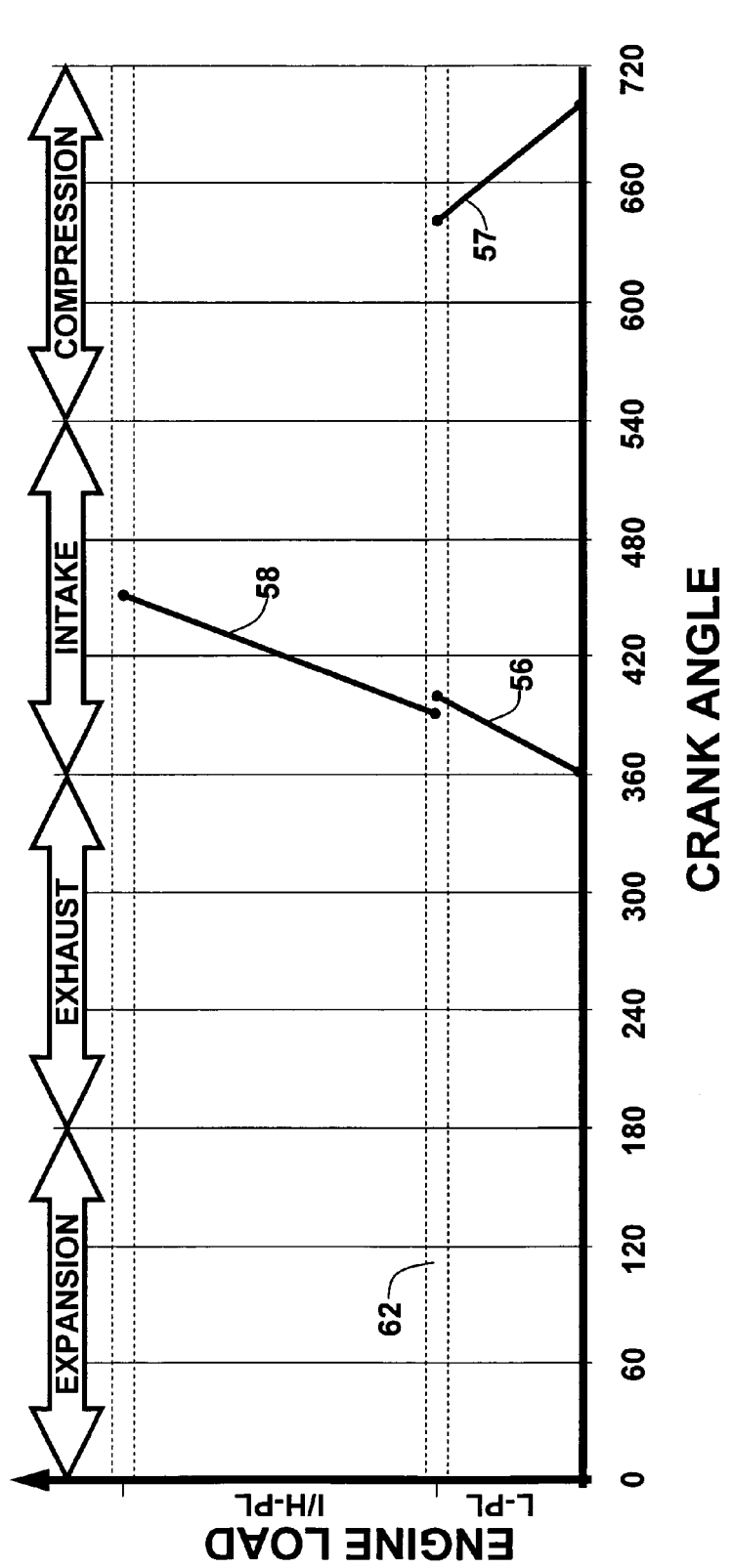
FIG. 8 illustrates part-load operating regions and exemplary fuel injection timing schedules corresponding thereto in accordance with exhaust gas re-breathe aspects of the present invention.

In accordance with the fueling control aspects of the present invention, two general load regions within the part load operating region of the engine are delineated. With reference to FIG. 8, low part load region is labeled L-PL and intermediate/high part load region is labeled I/H-PL. These regions are plotted against a complete four-stroke combustion cycle delineated variously by crank angle ATDC combustion at the bottom and corresponding sequentially repeated combustion cycle regions at the top. Generally, in the low part load region a split-injection of the total fuel charge is caused to occur whereas in the intermediate/high part load region a single-injection of the total fuel charge is caused to occur. There is illustrated in the figure transition region 62 which may significantly overlap one or both of the adjacent part load regions effectively extending the part load regions for corresponding fuel controls.

With the split-injection, the total fuel requirement for the cycle is divided into two injection events. One of the injection events is carried out early in the intake cycle while the other injection event is carried out late in the compression cycle. Generally, the first fueling event injects about 10 to about 50 percent of the total fuel requirement for the cycle. Generally, the cylinder charge established by this first fraction of fuel is insufficient for auto-ignition within the combustion chamber. The remainder of the fuel requirement for the cycle is injected during the second fueling event. This second fraction of fuel enriches the cylinder charge during a compression stroke of the piston sufficient to cause auto-ignition.

Penetration and dispersion of the second fuel spray are suppressed due to higher in-cylinder charge temperature and density. A localized rich mixture region is formed in the combustion chamber. The mixture of air, re-ingested combusted gas, and fuel from first fuel injection works in conjunction with the localized rich mixture formed by the second fuel injection to accomplish the auto-ignition of gasoline under a relatively low compression ratio without any help of spark as compared to a relatively high compression ratio used in the auto-ignition of diesel fuel.

The total fueling requirement (i.e. the combined first and second fuel fractions) for both of the described valve control and fueling strategies is significantly less than the fueling requirement of a similar conventionally operated internal combustion engine as determined against such common metrics as combustion stability as will be demonstrated later with respect to FIGS. 10 and 11.

In the high part load operating region (H-PL), a single injection of fuel is performed. With the single-injection, the total fuel requirement for the cycle is consolidated in one injection event carried out early in the intake cycle.

FIG. 8 is also demonstrative of certain preferences regarding injection timing. The region delimited by the solid lines labeled 56 and 57 correspond to preferred angular regions within the intake and compression cycles for delivery of the first fueling event and second fueling event, respectively, for the low part load operating region. Preferably, the first fraction of fuel is injected about 360 to about 400 degrees ATDC combustion. The injection timing for the first injection also preferably retards in a continuous manner as the engine load increases as shown in the figure. And the second fraction of fuel is injected about 640 to about 700 degrees ATDC combustion (20 to 80 degrees before top dead center combustion). This injection timing is chosen to ensure smoke-free operation and is affected by the injector spray cone angle and the amount of fuel injected. The injection timing for the second injection also preferably advances in a continuous manner as the engine load increases. Other angular regions for the split-injection injection may be utilized but may not yield as substantial an advantage as the preferred regions.

The region delimited by the solid line labeled 58 corresponds to a preferred angular region within the intake cycle for delivery of the intake cycle fueling event for the intermediate/high part load operating region. Preferably, this fuel is injected about 390 to about 450 degrees ATDC combustion. The injection timing for the single-injection also preferably retards in a continuous manner as the engine load increases as shown in the figure. Other angular regions for the single-injection may be utilized but may not yield as substantial an advantage as the preferred regions.

Figure 9:
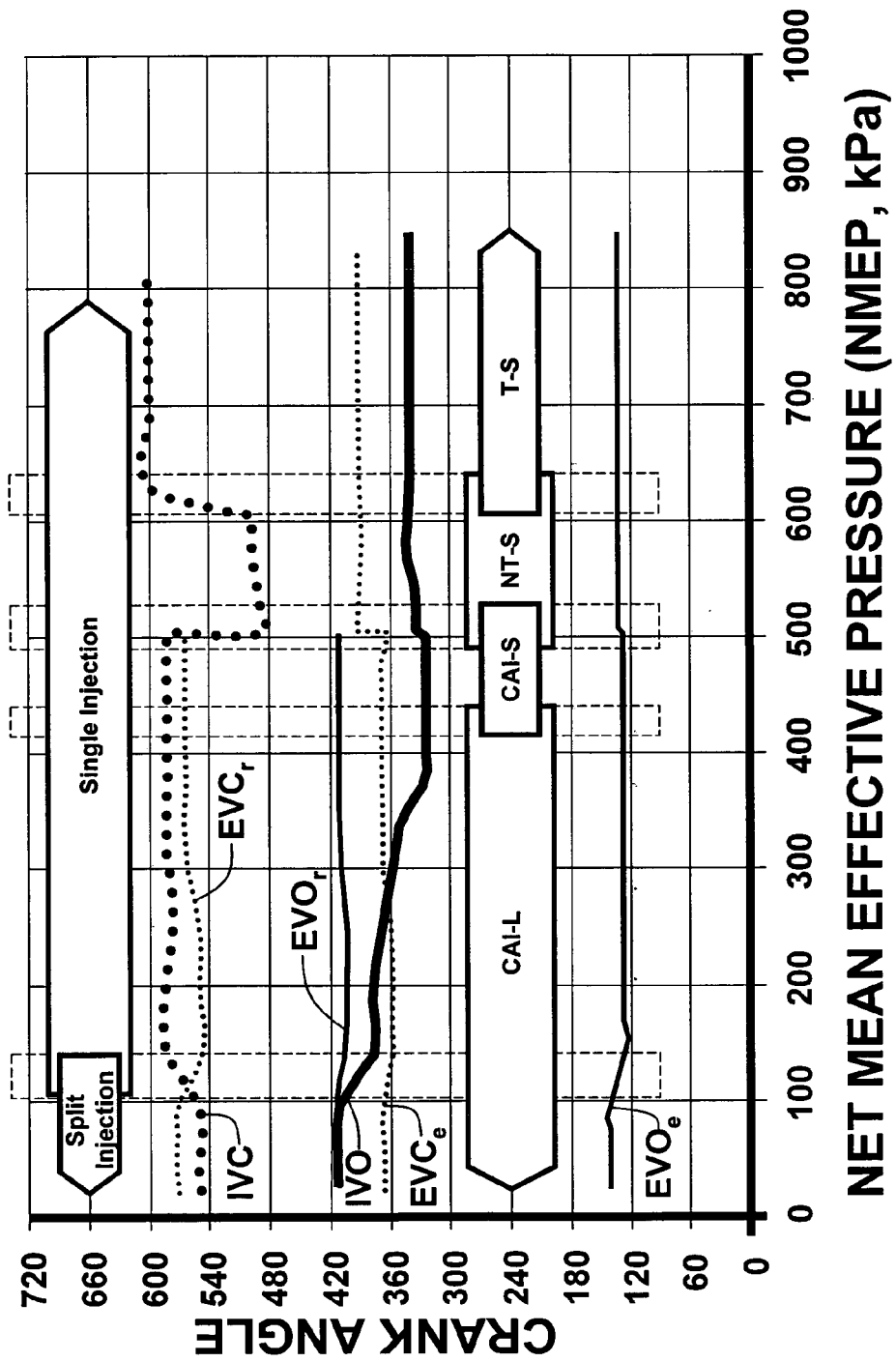
FIG. 9 illustrates exemplary valve timing effected by fully flexible valve actuation, fuel injection strategies and combustion modes versus part load regions of engine operation in accordance with the present invention.

Transition from one injection strategy to another during load change is regulated by both engine performance and emissions. For example, during operation with low part load, split-injection with first injection during early intake stroke and second injection during compression stroke is the only injection strategy that is capable of generating stable controlled auto-ignition combustion. The injection timing for the second injection is advanced continuously with increasing engine load to promote dispersion of fuel within the combustion chamber and to keep the air/fuel ratio of the localized mixture within an acceptable range to avoid unacceptable levels of NOx and smoke emissions. However, even with the advanced injection timing, formation of nitrogen oxides (NOx) can still rise to unacceptable level during operation with intermediate part load. Thus, the injection strategy is switched from split-injection to single-injection as shown in FIG. 9 about 100 to about 140 kPa Net Mean Effective Pressure (NMEP). Experiments confirm that both split and single injection strategies result in similar engine performance during intermediate part load engine operation. Comparative NOx emissions are significantly less with single fuel injection during intake stroke than with the split-injection. Comparative hydrocarbon (HC) emissions, however, are greater with single fuel injection during intake stroke due to increases in crevice-trapped fuel that escapes combustion than with the split-injection. Therefore, the exact load where the transition takes place will be determined by NOx-HC emissions tradeoff.

FIG. 9 shows exemplary opening and closing valve timings as a function of engine load for the exhaust and intake valves of a four-stroke internal combustion engine operating in accordance with the present invention using a FFVA system. Therein, the following labeling is used: intake valve opening (IVO); intake valve closing (IVC); exhaust valve opening—exhaust ($EVO_e$); exhaust valve closing—exhaust ($EVC_e$); exhaust valve opening—re-breathe ($EVO_r$); and, exhaust valve closing—re-breathe ($EVC_r$). Also shown in FIG. 9 are the load dependent injection strategies and various combustion modes as a function of engine load in accordance with the present invention. In particular, the engine is operated in controlled auto-ignition combustion mode with lean air/fuel mixture (CAI-L) below about 420 kPa NMEP. During this combustion mode, the NOx emission index increases with increasing engine load. At about 420 kPa NMEP, the NOx emission index is around 1 g/kg fuel. Between about 420 and about 500 kPa NMEP, the engine is operated in controlled auto-ignition combustion mode with stoichiometric air/fuel ratio (CAI-S) to allow the use of traditional 3-way catalyst after treatment for NOx control. Between about 500 and about 600 kPa NMEP, the engine is operated in spark-ignition, non-throttled combustion mode with stoichiometric air/fuel mixture (NT-S) using early intake valve closing for load control. Beyond about 600 kPa NMEP, the engine is operated in traditional spark-ignition, throttled combustion mode with stoichiometric air/fuel mixture (T-S) until reaching full load.

Additional details respecting combustion gas recirculation valve and fuel controls for controlled auto-ignition are found in commonly assigned and co-pending U.S. patent application Ser. No. 10/899,442, the contents of which are incorporated herein by reference.

Figure 10:
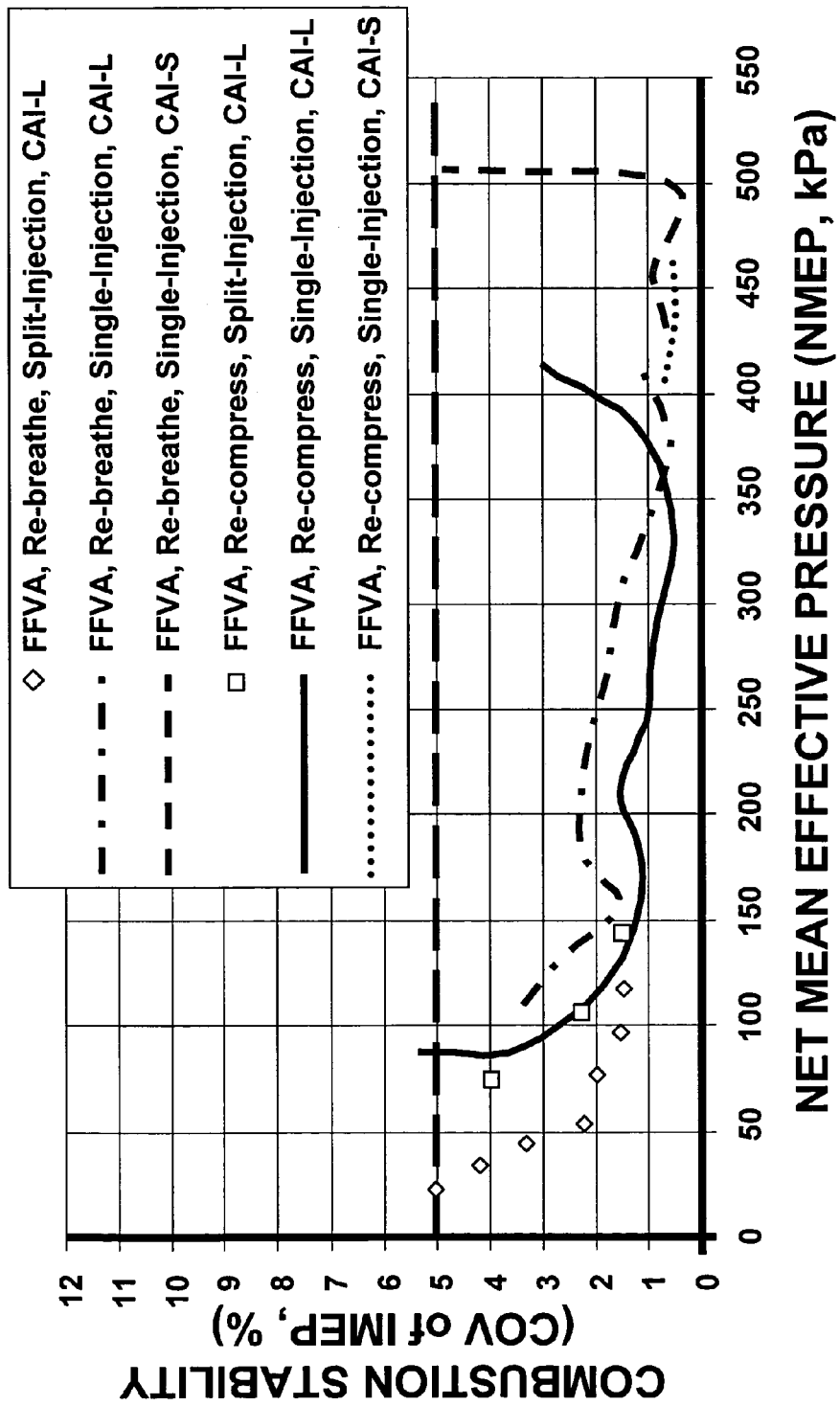
FIG. 10 comparatively illustrates exemplary combustion stability versus cylinder net mean effective pressure curves demonstrative of part load stability benefits of fully flexible valve actuation and fueling control aspects in accordance with the present invention.
Figure 11:
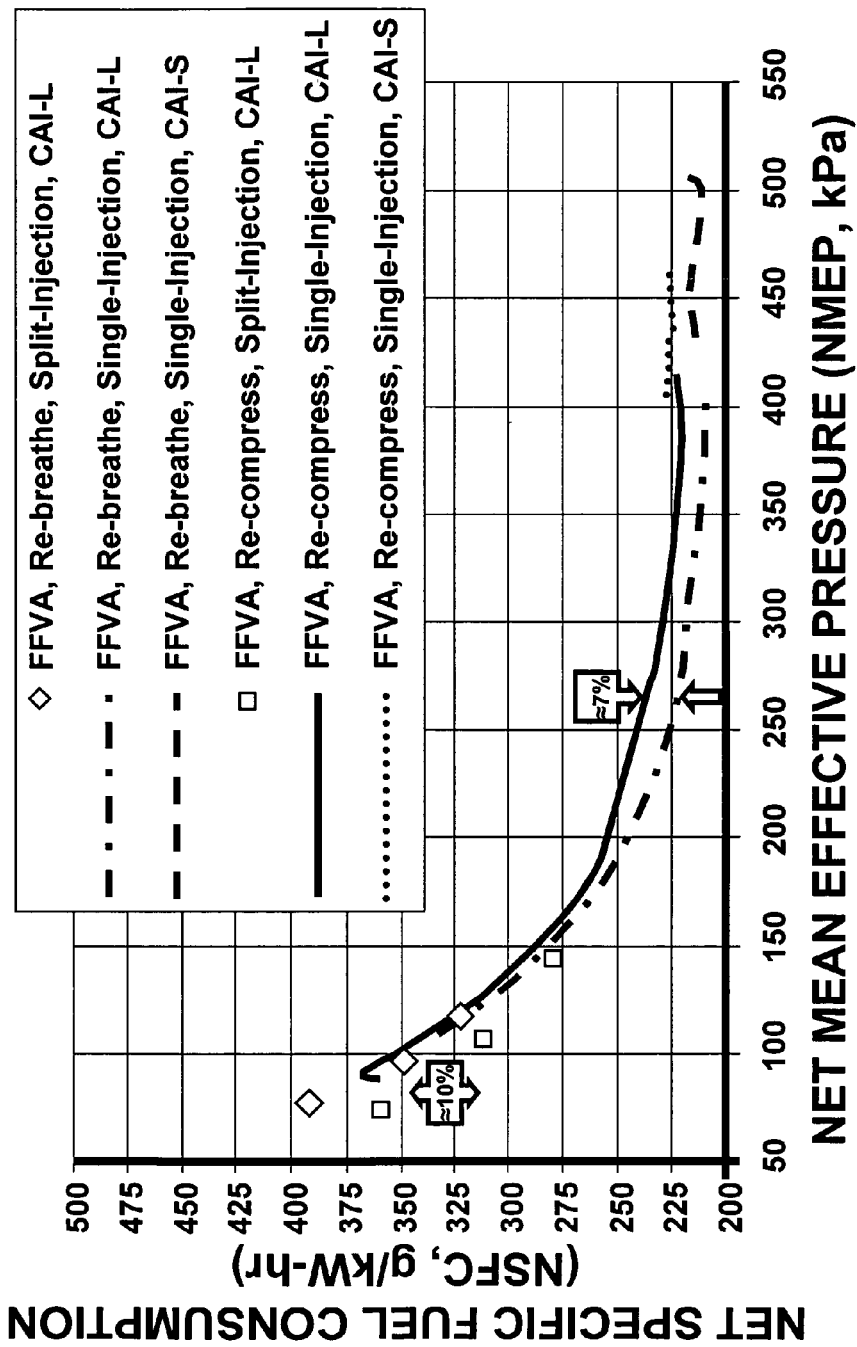
FIG. 11 comparatively illustrates net-specific fuel consumption versus cylinder net mean effective pressure curves demonstrative of part load fuel consumption benefits of the fully flexible valve actuation and fueling control aspects in accordance with the present invention.

FIGS. 10 and 11 show the measured combustion stability (COV of IMEP) and net specific fuel consumption (NSFC) as a function of engine load (NMEP) for a single cylinder direct-injection gasoline four-stroke internal combustion engine operating under controlled auto-ignition combustion mode using a FFVA system to effect the cylinder conditions described herein above. In each of FIGS. 10 and 11, two sets of data are set forth. One set of data illustrates the benefits of the present invention relative to a combustion gas re-breathe valve control and corresponding fuel strategy as previously described herein above in relation to FIGS. 6–9. The other set of data illustrates the benefits of the present invention relative to a combustion gas trapping and re-compression valve control and corresponding fuel strategy as previously described herein above in relation to FIGS. 3–5.

Without using the valve and fuel controls of the current invention, the low part load limit of the exemplary—and most typical—four-stroke direct-injection auto-ignition gasoline engine is around 240 kPa Net Mean Effective Pressure (NMEP) with a generally accepted 5% Coefficient of Variation of Indicated Mean Effective Pressure (COV of IMEP) as an indicator. It can be seen from FIG. 10 that with the combination of the respective re-breathe and re-compression FFVA valve and fueling aspects of the present invention optimal combustion phasing for controlled auto-ignition combustion is obtained throughout the part load range between about 25 and about 500 kPa NMEP with less than 5% COV IMEP according to the present invention. FIG. 11 is demonstrative of the net specific fuel consumption obtained in practicing the respective re-breathe and re-compression FFVA valve and fuel aspects of the present invention.

Figure 12:
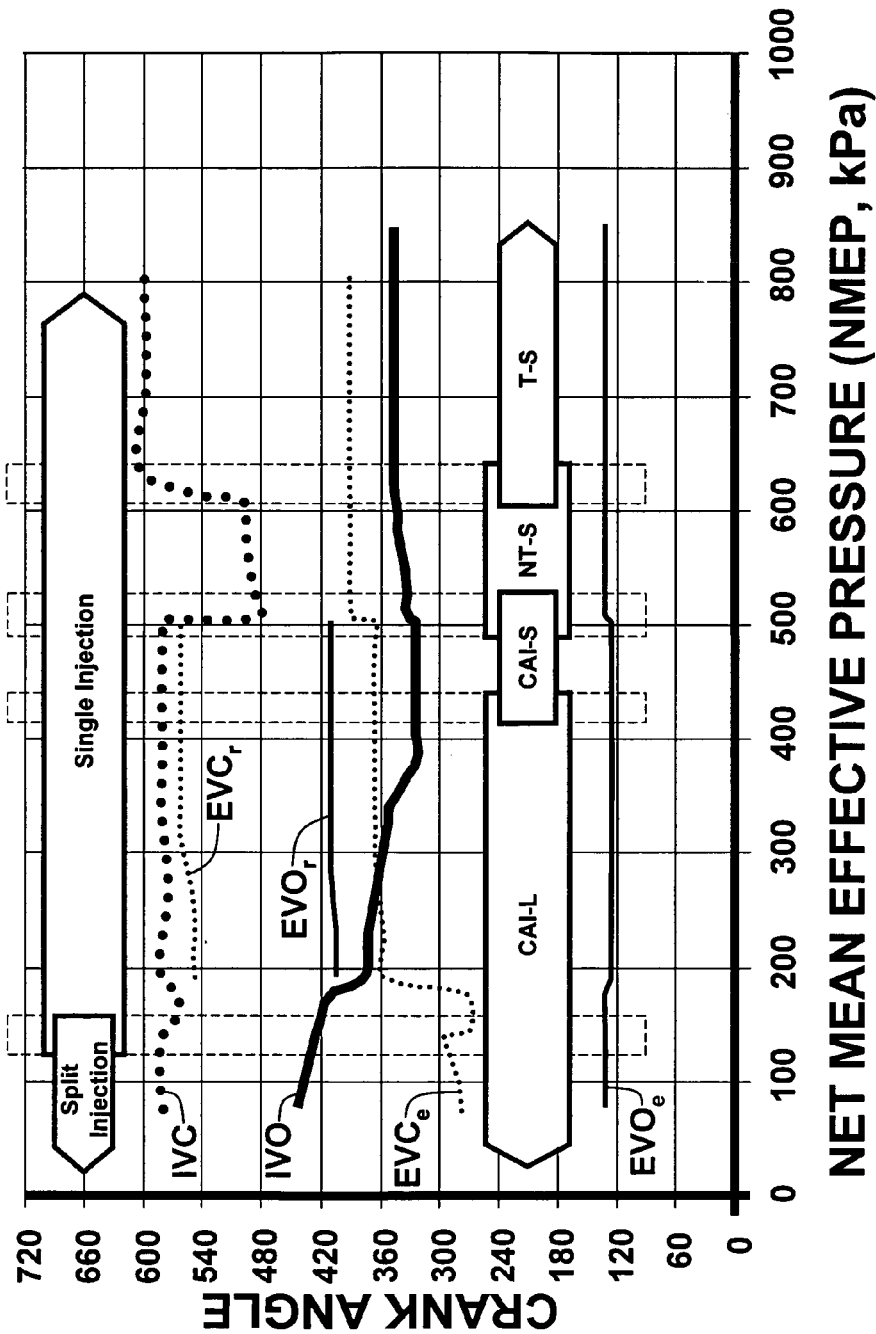
FIG. 12 illustrates exemplary valve timing effected by fully flexible valve actuation selectively combining exhaust gas trapping/re-compression and re-breathe strategies, fuel injection strategies and combustion modes versus part load regions of engine operation in accordance with the present invention.

Careful inspection of the comparative net specific fuel consumption benefits of the re-breathe versus re-compression valve and fueling controls exhibited in FIG. 11 supports preferred ranges for selective implementation of one of the previously described combinations of FFVA re-breathe or re-compress valve controls and corresponding fueling controls. The re-compression valve and fuel control exhibits a net specific fuel consumption advantage of approximately 10% below about 150 kPa NMEP. The re-breathe valve and fuel control exhibits a net specific fuel consumption advantage of approximately 7% above about 200 kPa NMEP. A hybrid control strategy employing exhaust re-compression at lower part loads and exhaust re-breathe at higher part loads is implemented to capitalize on the net specific fuel consumption advantages unique to each of the re-compression and re-breathe strategies. An exemplary part load transition below which a FFVA re-compression valve control is implemented and above which a FFVA re-breathe valve control is implemented is illustrated in FIG. 12 as corresponding to about 200 kPa NMEP. In FIG. 12, it can clearly be seen that substantial negative valve overlap is practiced below about 200 kPa NMEP (i.e. earlier crank angle exhaust valve closing $EVC_e$ and later crank angle intake valve opening IVO), whereby combusted gases are trapped and compressed as described herein above. Above about 200 kPa NMEP it can be seen that exhaust valve re-breathe opening is practiced during substantially the remainder of part load engine operation up to about 500 kPa NMEP, whereby combusted gases are re-ingested as described herein above.

Figure 13:
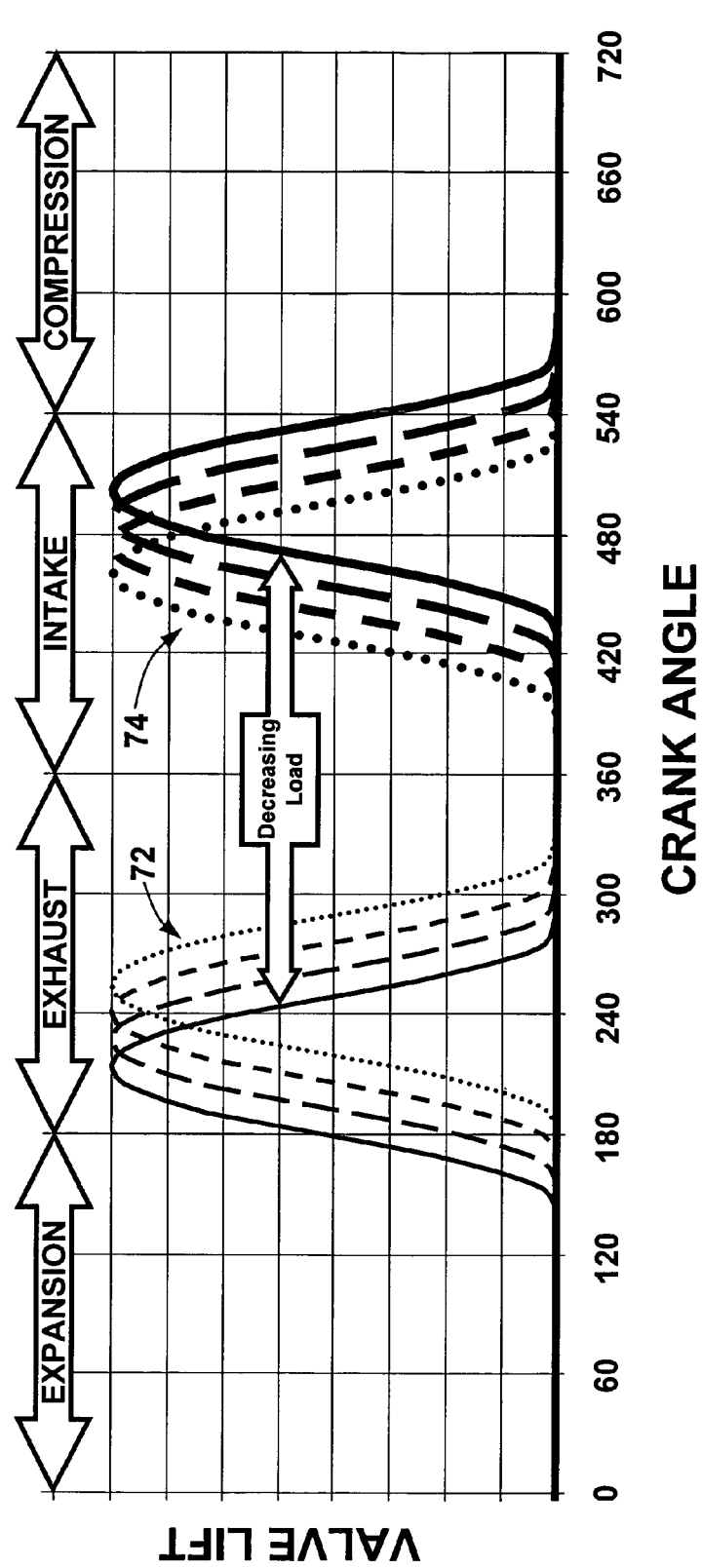
FIG. 13 illustrates various exhaust and intake valve phase and lift versus crank angle curves and preferred trend correspondence to engine load corresponding to the single cylinder engine of FIG. 1 with phase controlled valve actuation for effecting desired in cylinder conditions in accordance with the present invention.
Figure 14:
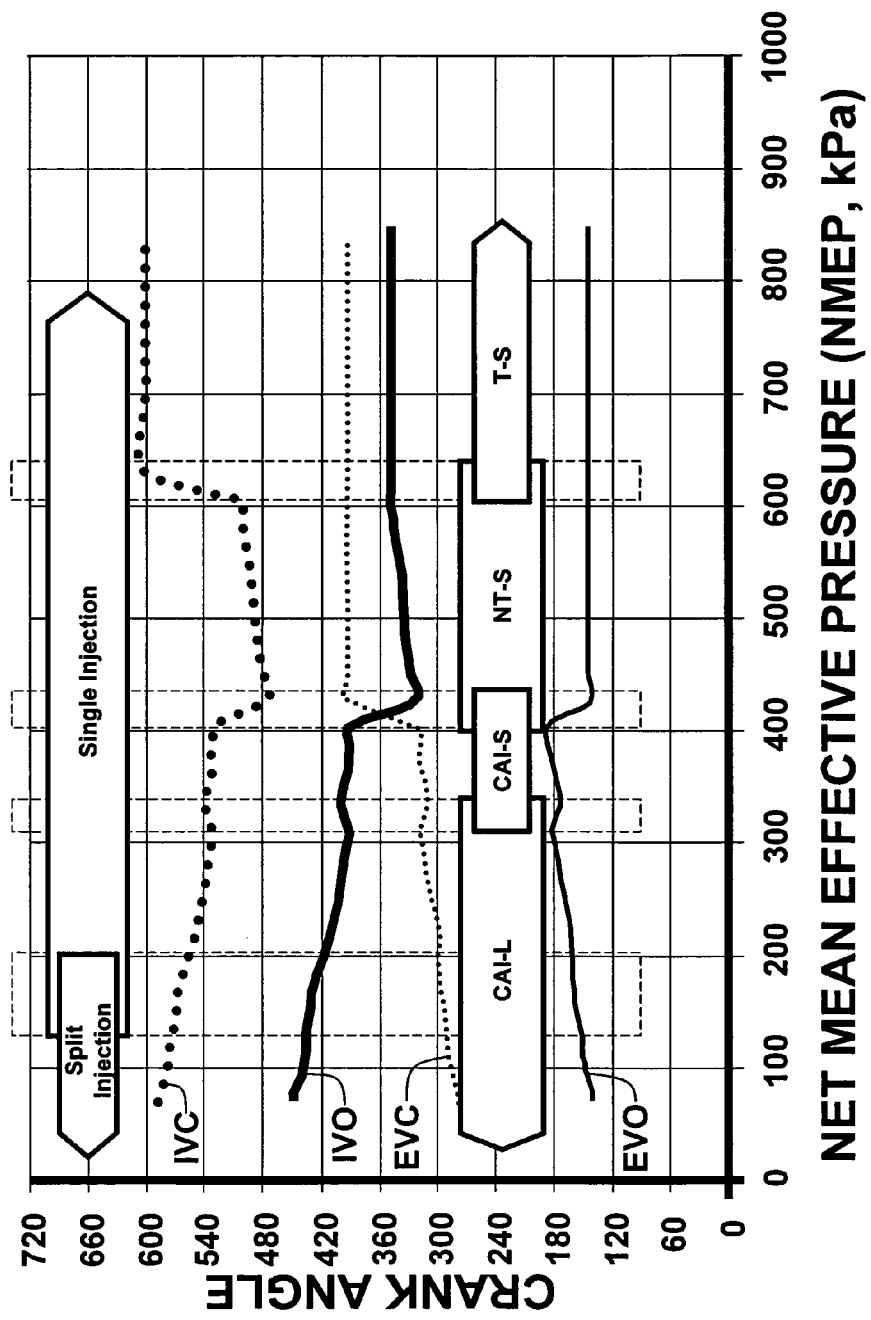
FIG. 14 illustrates exemplary valve timing effected by phase controlled valve actuation, fuel injection strategies and combustion modes versus part load regions of engine operation in accordance with the present invention.

FIGS. 13 and 14 illustrate an alternative valve topology implementation of the present invention to effect the combusted gas retention and compression aspects thereof. Therein, 2-step hydraulically controlled valve lift mechanisms together with cam phaser mechanisms, both of well known varieties, provide intake valve and exhaust valve phase shifting to effect the desired combustion chamber conditions in accordance with the present invention. The intake valve schedule is illustrated with an exemplary duration of substantially 165 degrees illustrated in each of the individual curves comprising the intake schedule 74 from more advanced to more retarded phasing as engine load decreases. The exhaust valve schedule is similarly illustrated with an exemplary duration of substantially 165 degrees illustrated in each of the individual curves comprising the exhaust schedule 72 from more retarded to more advanced phasing as engine load decreases.

The closing timing of the exhaust valve is seen to vary as a function of the engine load as indicated by the decreasing load arrow central in the figure. During part load operation, the lower the engine load goes, the more advanced is the exhaust valve closing timing (and the more advanced is the opening timing as well due to the phaser implementation). Thus, it is generally true that decreasing loads will result in increased combusted gas trapping and higher compression temperature and pressure thereof. This results in the same desired in-cylinder conditions as described with respect to a FFVA implementation. Therefore, the desired trending of increases in trapped combusted gases and increases in pressures and temperatures with decreases in engine operating loads is accomplished with the phase control of the exhaust valve lift mechanism. A generally symmetrical and directionally opposite phasing of the intake valve timing is effected also as illustrated in each of the individual curves comprising the intake schedule 74 to provide the relaxation benefits described herein above with respect to a FFVA implementation.

The fueling strategy previously described in detail with respect to FIG. 4 is equally, desirably applicable to the immediately preceding described alternative re-compression valve control implementation. The considerations respecting load regions, split and single injections, timings, advances, retards, transitions, emissions, and lean and stoichiometric fuel ratios all presently apply as previously described.

FIG. 14 shows exemplary opening and closing valve timings as a function of engine load for the exhaust and intake valves of a four-stroke internal combustion engine operating in accordance with the present invention to effect exhaust gas re-compression using 2-step/phaser variable valve actuation hardware. Therein, the labeling convention follows that previously described in relation to FIG. 5. Also shown in FIG. 14 are the load dependent injection strategies and various combustion modes as a function of engine load in accordance with the present invention.

Figure 15:
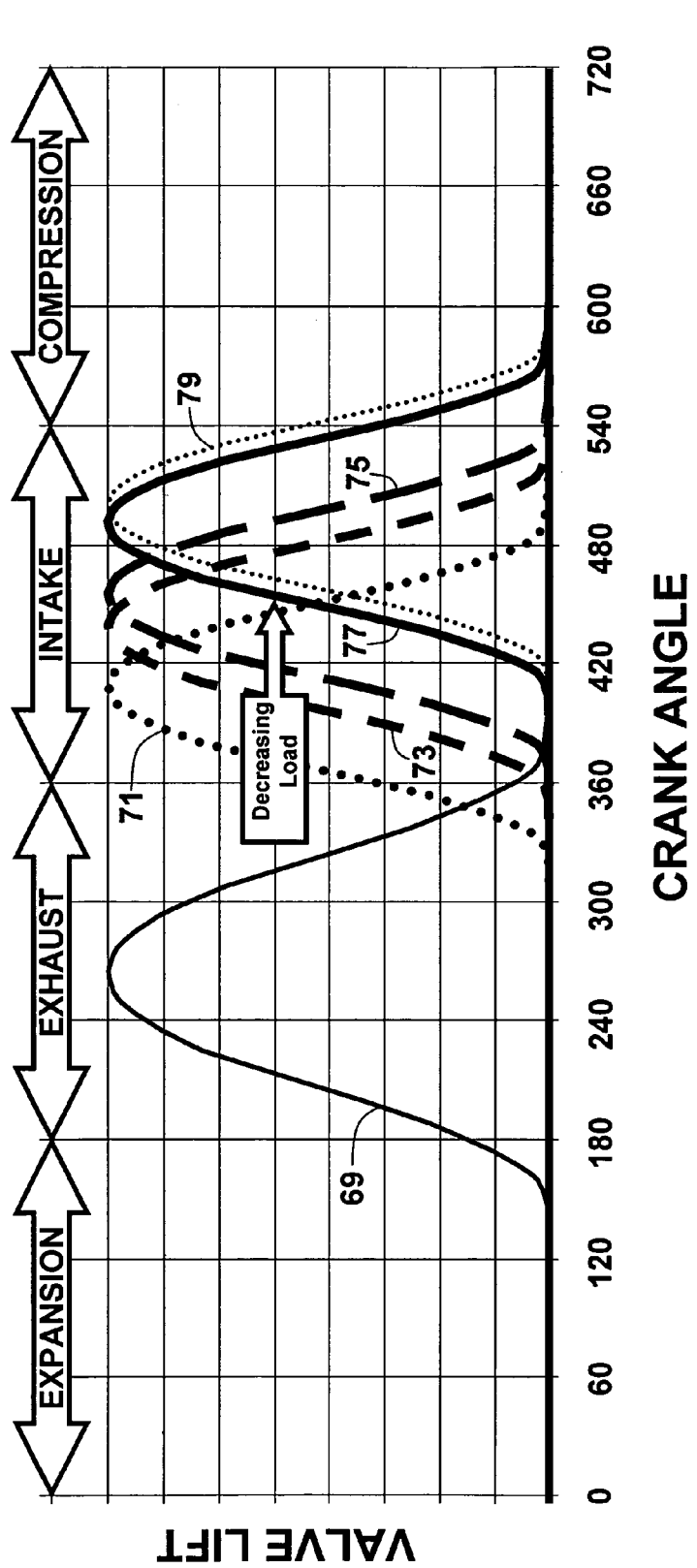
FIG. 15 illustrates various exhaust and intake valve phase and lift versus crank angle curves and preferred trend correspondence to engine load corresponding to the single cylinder engine of FIG. 1 with phase controlled valve actuation for effecting desired in cylinder conditions in accordance with the present invention.
Figure 16:
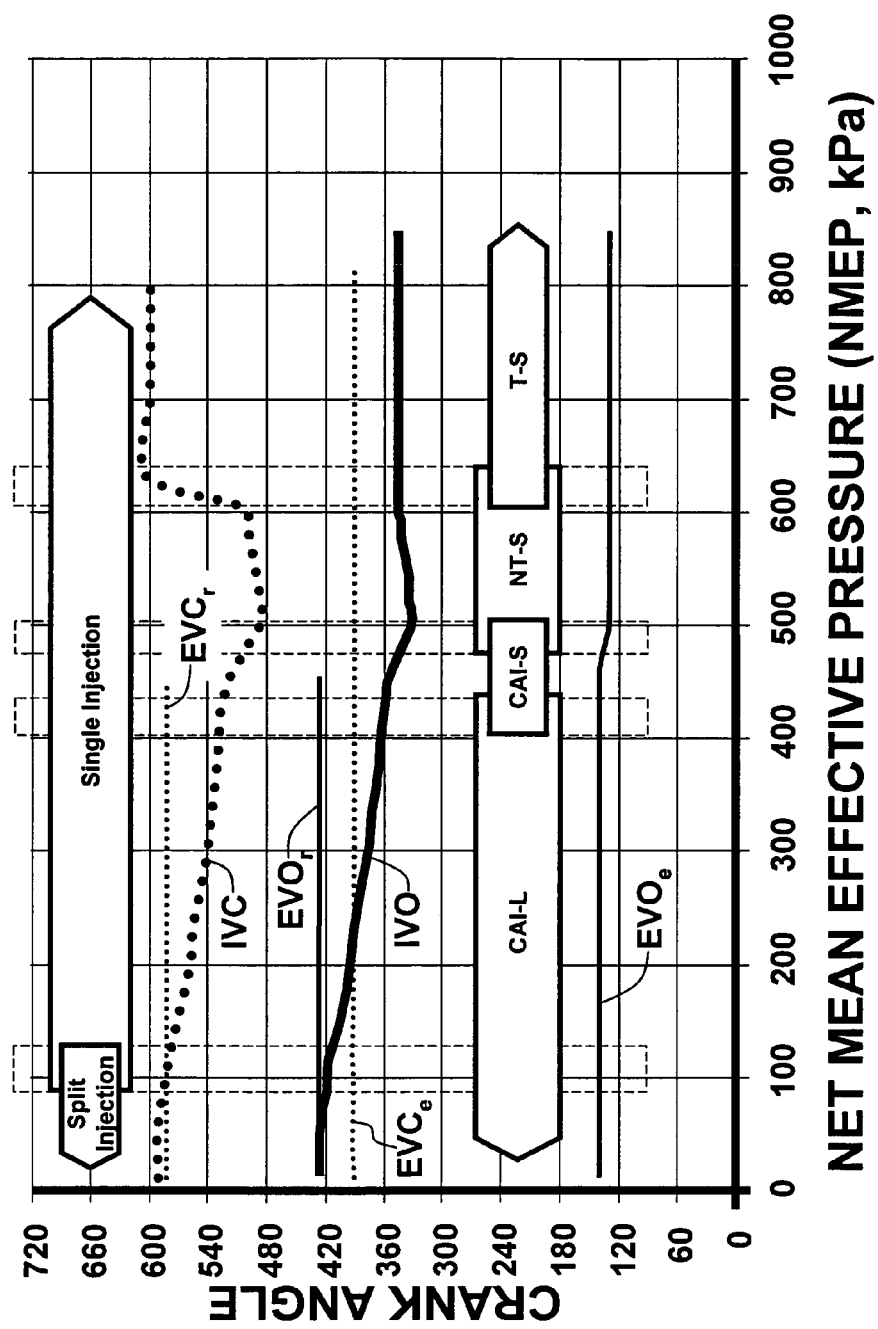
FIG. 16 illustrates exemplary valve timing effected by phase controlled valve actuation, fuel injection strategies and combustion modes versus part load regions of engine operation in accordance with the present invention.

FIGS. 15 and 16 illustrate an alternative valve topology implementation of the present invention to effect the combusted gas re-breathe aspects thereof. Therein, 2-step hydraulically controlled valve lift mechanisms together with cam phaser mechanisms, both of well known varieties, provide the intake valve phase shifting and exhaust valve re-breathe event lift to effect the desired combustion chamber conditions in accordance with the present invention. The intake valve schedule is illustrated with an exemplary intake duration of substantially 165 degrees at individual phase shifted positions variously labeled 71, 73, 75 and 77 from more advanced to more retarded phasing.

Low pressure is established within the combustion chamber vis-à-vis intake valve phase shifting controlling the opening of the intake valve relative to the closing of the exhaust valve at the end of the exhaust event. In the present example illustrated in FIG. 15, it is assumed that an exhaust event is caused to occur wherein the exhaust valve is opened for at least a portion of the exhaust stroke from 180 to 360 degrees. In the present illustrated example the exhaust valve closure is assumed to correspond substantially to 380 degrees ATDC combustion or 20 degrees after exhaust stroke TDC. Preferential exhaust valve closing phase is as described earlier with respect to the FFVA implementation (substantially within approximately 20 degrees before exhaust stroke TDC to 20 degrees after exhaust stroke TDC, and more preferably within approximately exhaust stroke TDC to 20 degrees after exhaust stroke TDC).

The previously discussed considerations relative to asymmetry of exhaust valve closing and intake valve opening about TDC, minimal valve overlap, and in-cylinder pressure relaxation are applicable to the present valve phaser implementation. Preferably, the intake valve opening during an intake event follows the exhaust valve closing at about 30 to about 90 degrees after exhaust stroke TDC at low part load operating points.

These characteristics of intake and exhaust valve phasings heretofore described are substantially set forth in the exemplary curves illustrated in FIG. 15. Exhaust profile 69 represents an exhaust event exhaust valve profile wherein valve closure occurs at substantially 20 degrees after exhaust stroke TDC. For purposes of exposition it is assumed that the exhaust event is substantially static with respect to exhaust event exhaust valve closure phasing although, as described previously, it is contemplated that phase shifting of the exhaust valve profile is within the scope of the invention in attaining various outcomes and objectives thereof. Intake profile 77 corresponds to intake valve opening at substantially 40 degree after exhaust stroke top dead center and closing at substantially 25 degrees after intake stroke bottom dead center to effect one level of in cylinder vacuum. Intake profiles 75, 73 and 71 correspond to earlier intake valve openings at substantially 20 degrees after, at and 30 degrees before exhaust stroke top dead center, respectively. Corresponding intake valve closings for profiles 75, 73 and 71 are at substantially 5 degrees after, 15 degrees before and 45 degrees before intake stroke bottom dead center, respectively. In accordance with the objective of effecting decreasing cylinder pressures at progressively lower engine loads, the trend of the phase curves follows the decreasing load arrow shown in the figure.

A continuum of such intake profiles, as exemplified in the finite discrete examples plotted in the figure, with phase shifting corresponding to engine load as shown, would result in the desired varying vacuum levels and durations thereof within the combustion chamber. Additional details respecting varying vacuum levels is set forth in additional detail in previously incorporated, commonly assigned and co-pending U.S. patent application Ser. Nos. 10/611,845, 10/611, 366, and 10/899,443.

Recirculated exhaust gases are desirably introduced into the combustion chamber for mixing with air and fuel. Presently, with reference once again to the valve schedules exhibited in FIG. 15, an exhaust re-breathe exhaust valve actuation effects re-ingestion of combusted gases previously expelled into the exhaust passage through the exhaust valve. Lift variation allows for variations in gas constituent mixtures and temperatures in this exhaust re-breathe implementation. An exemplary re-breathe schedule is labeled 79 in FIG. 15.

The fueling strategy previously described in detail with respect to FIG. 8 is equally, desirably applicable to the immediately preceding described alternative re-breathe valve control implementation of in-cylinder pressure trend controls. The considerations respecting load regions, split and single injections, timings, advances, retards, transitions, emissions, and lean and stoichiometric fuel ratios all presently apply as previously described.

FIG. 16 shows exemplary opening and closing valve timings as a function of engine load for the exhaust and intake valves of a four-stroke internal combustion engine operating in accordance with the present invention to effect exhaust gas re-breathing using 2-step/phaser variable valve actuation hardware. Therein, the labeling convention follows that previously described in relation to FIG. 9. Also shown in FIG. 16 are the load dependent injection strategies and various combustion modes as a function of engine load in accordance with the present invention.

Figure 17:
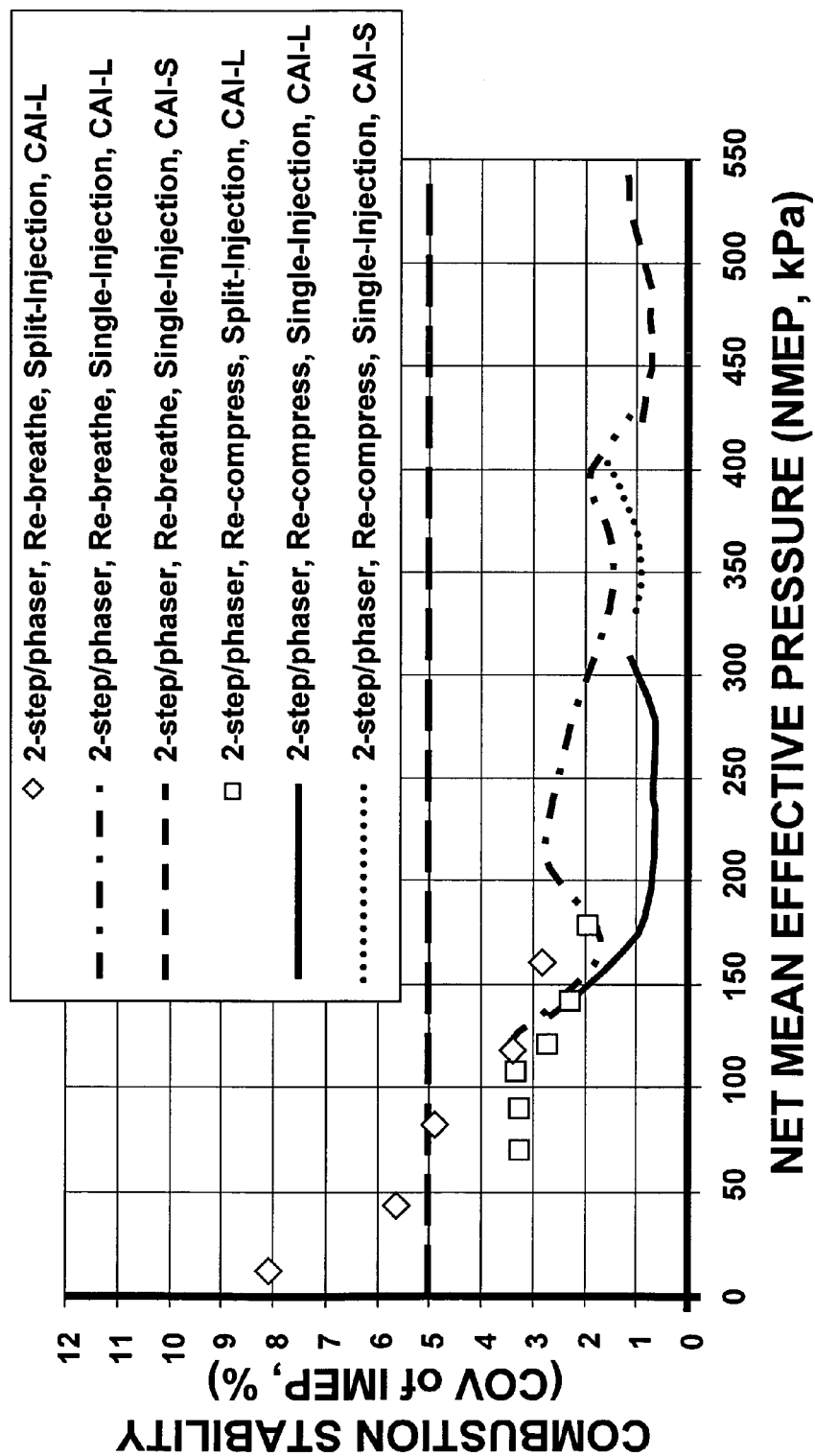
FIG. 17 comparatively illustrates exemplary combustion stability versus cylinder net mean effective pressure curves demonstrative of part load stability benefits of phase controlled valve actuation and fueling control aspects in accordance with the present invention.
Figure 18:
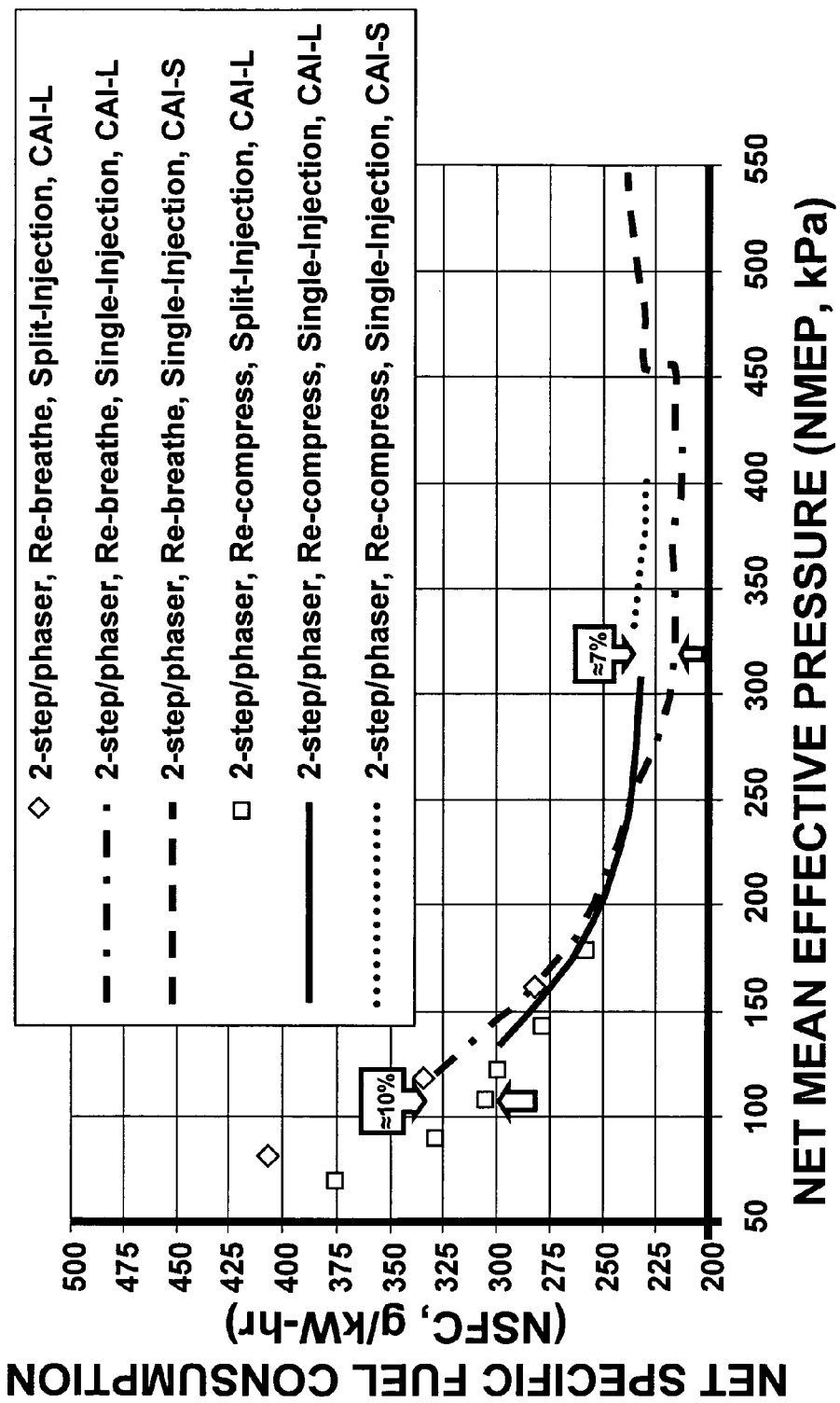
FIG. 18 comparatively illustrates net-specific fuel consumption versus cylinder net mean effective pressure curves demonstrative of part load fuel consumption benefits of phase controlled valve actuation and fueling control aspects in accordance with the present invention.

FIGS. 17 and 18 show the measured combustion stability (COV of IMEP) and net specific fuel consumption (NSFC) as a function of engine load (NMEP) for a single cylinder direct-injection gasoline four-stroke internal combustion engine operating under controlled auto-ignition combustion mode using 2-step/phaser hardware to effect the cylinder conditions described herein above. In each of FIGS. 17 and 18, two sets of data are set forth. One set of data illustrates the benefits of the present invention relative to a combustion gas re-breathe valve control and corresponding fuel strategy as previously described herein above in relation to FIGS. 15–16. The other set of data illustrates the benefits of the present invention relative to a combustion gas trapping and re-compression valve control and corresponding fuel strategy as previously described herein above in relation to FIGS. 13–14.

It can be seen from FIG. 17 that with the combination of the 2-step/phaser valve and fueling aspects of the present invention optimal combustion phasing for controlled auto-ignition combustion is obtained throughout the part load range between about 70 and about 500 kPa NMEP with less than 5% COV IMEP according to the present invention. FIG. 18 is demonstrative of the net specific fuel consumption obtained in practicing the respective re-breathe and re-compression 2-step/phaser valve and fuel aspects of the present invention.

Figure 19:
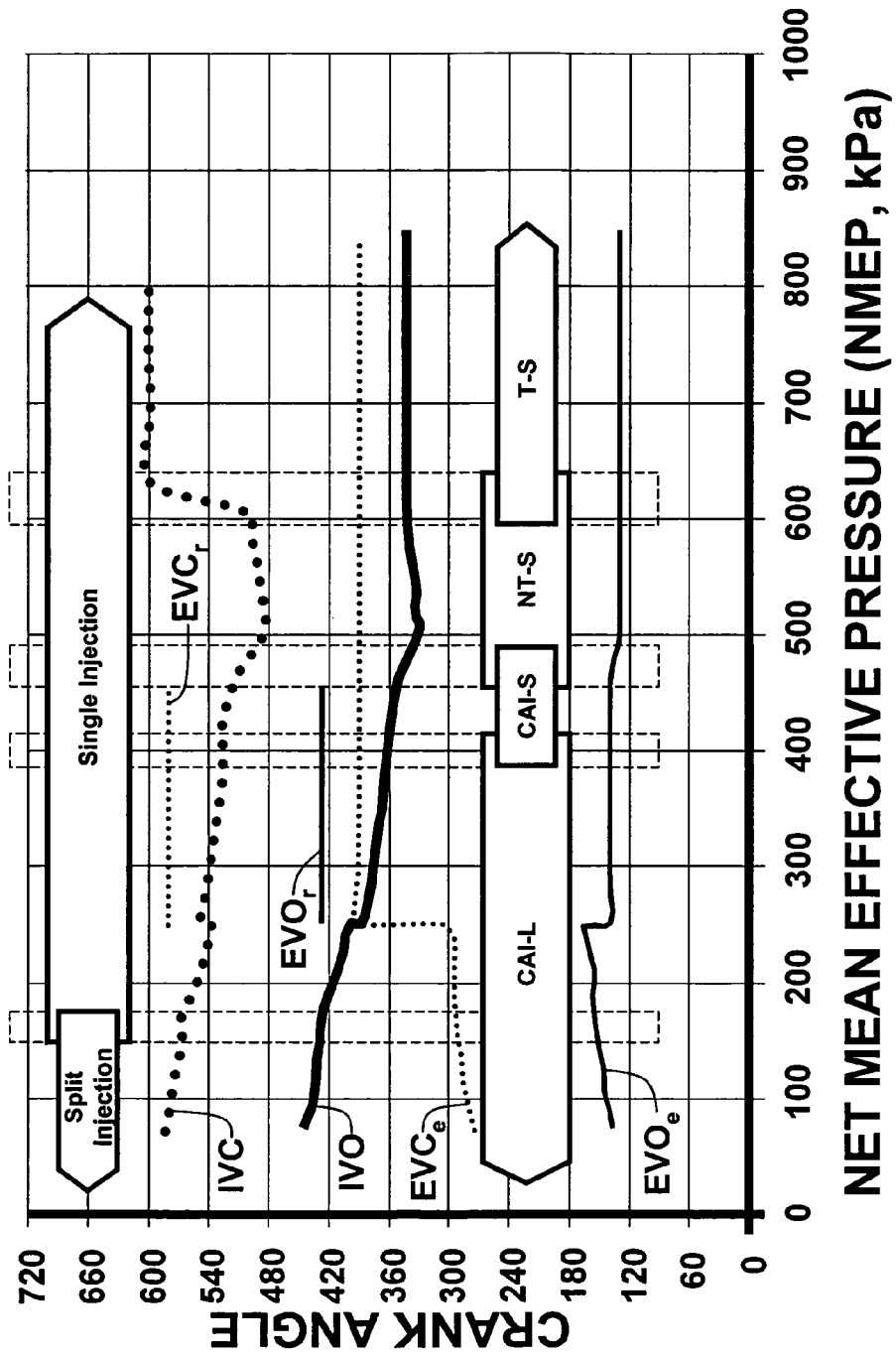
FIG. 19 illustrates exemplary valve timing effected by phase controlled valve actuation selectively combining exhaust gas trapping/re-compression and re-breathe strategies, fuel injection strategies and combustion modes versus part load regions of engine operation in accordance with the present invention.

Careful inspection of the comparative net specific fuel consumption benefits of the re-breathe versus re-compression valve and fueling controls exhibited in FIG. 18 supports preferred ranges for selective implementation of one of the previously described combinations of 2-step/phaser re-breathe or re-compress valve controls and corresponding fueling controls. The re-compression valve and fuel control exhibits a net specific fuel consumption advantage of approximately 10% below about 200 kPa NMEP. The re-breathe valve and fuel control exhibits a net specific fuel consumption advantage of approximately 7% above about 250 kPa NMEP. A hybrid control strategy employing exhaust re-compression at lower part loads and exhaust re-breathe at higher part loads is implemented to capitalize on the net specific fuel consumption advantages unique to each of the re-compression and re-breathe strategies. An exemplary part load transition below which a multi-step/phaser re-compression valve control is implemented and above which a multi-step/phaser re-breathe valve control is implemented is illustrated in FIG. 19 as corresponding to about 250 kPa NMEP. In FIG. 19, it can clearly be seen that substantial negative valve overlap is practiced below about 250 kPa NMEP (i.e. earlier crank angle exhaust valve closing $EVC_e$ and later crank angle intake valve opening IVO), whereby combusted gases are trapped and compressed as described herein above. Above about 250 kPa NMEP it can be seen that exhaust valve re-breathe opening is practiced during substantially the remainder of part load engine operation up to about 500 kPa NMEP, whereby combusted gases are re-ingested as described herein above.

The exhaust gas recirculation described herein above has been with respect to non-limiting examples of FFVA, multi-step lift and cam phaser implementations of re-breathe exhaust valve actuations. In accordance with an alternative re-breathe implementation for exhaust gas recirculation, the intake valve is opened during at least a portion of the exhaust event to expel combusted gases into the intake passage 17 for subsequent recirculation or re-breathe thereof by drawing them back into the combustion chamber vis-à-vis the intake valve. Re-breathe intake valve actuations may similarly be effected by FFVA, multi-step lift and cam phaser implementations. Additional details of such intake valve based exhaust gas re-breathing in conjunction with establishment of low combustion chamber pressures is disclosed in previously incorporated, commonly assigned and co-pending U.S. Ser. No. 10/899,443. Additionally, external exhaust gas recirculation apparatus may be employed. For example, conventional exhaust gas recirculation valves may provide adequate combusted gases to an intake passage of the engine where adequate intake vacuum is present for forced ingestion. Alternatively, where sufficient vacuum is not present in an intake passage—such as is the case with non-throttled modes of operation typical in controlled autoignition systems—an exhaust gas recirculation pump may provide positive pressure feeding of combusted gases to the intake.

The present invention has been described with respect to certain preferred embodiments and variations herein. Other alternative embodiments, variations ad implementations may be implemented and practiced without departing from the scope of the invention which is to be limited only by the claims as follow:

The invention claimed is:

1. Method of operating a four-stroke internal combustion engine during part load operation, said engine including a variable volume combustion chamber defined by a piston reciprocating within a cylinder between top-dead center and bottom-dead center points, intake and exhaust passages, and intake and exhaust valves controlled during repetitive, sequential exhaust, intake, compression and expansion strokes of said piston comprising:
  trapping and re-compressing combusted gases in the combustion chamber when engine operation is below a predetermined part load operating point effective to provide elevated combustion chamber temperature and pressure conditions;
  establishing recirculated combusted gases within the combustion chamber during intake strokes when engine operation is above said predetermined part load operating point;
  supplying at least a portion of a total combustion cycle fuel requirement into said elevated combustion chamber temperature and pressure conditions when engine operation is below said predetermined part load operating point; and
  supplying the total combustion cycle fuel requirement during the intake stroke when engine operation above said predetermined part load operating point.

2. Method of operating a four-stroke internal combustion engine as claimed in claim 1 wherein establishing recirculated combusted gases comprises external combusted gas recirculation.

3. Method of operating a four-stroke internal combustion engine as claimed in claim 1 wherein supplying at least a portion of a total combustion cycle fuel requirement into said elevated combustion chamber temperature and pressure conditions when engine operation is below said predetermined part load operating point further comprises:
  during high part load engine operation, initiating an injection of the total combustion cycle fuel requirement into the combustion chamber during one of the exhaust stroke and the intake stroke.

4. Method of operating a four-stroke internal combustion engine as claimed in claim 3 wherein said injection of the total combustion cycle fuel requirement is retarded as engine load increases.

5. Method of operating a four-stroke internal combustion engine as claimed in claim 1 wherein supplying the total combustion cycle fuel requirement during the intake stroke when engine operation is above said predetermined part load operating point further comprises:
  initiating an injection of the total combustion cycle fuel requirement into the combustion chamber during the intake stroke.

6. Method of operating a four-stroke internal combustion engine as claimed in claim 5 wherein said injection of the total combustion cycle fuel requirement is retarded as engine load increases.

7. Method of operating a four-stroke internal combustion engine as claimed in claim 1 wherein supplying at least a portion of a total combustion cycle fuel requirement into said elevated combustion chamber temperature and pressure conditions when engine operation is below said predetermined part load operating point further comprises:
  during low part load engine operation, initiating a first injection of fuel into the combustion chamber during the exhaust stroke and initiating a second injection of fuel into the combustion chamber during the compression stroke.

8. Method of operating a four-stroke internal combustion engine as claimed in claim 7 wherein said first injection of fuel is retarded as engine load increases.

9. Method of operating a four-stroke internal combustion engine as claimed in claim 7 wherein said second injection of fuel is advanced as engine load increases.

10. Method of operating a four-stroke internal combustion engine as claimed in claim 7 wherein said first injection of fuel is retarded and said second injection of fuel is advanced as engine load increases.

11. Method of operating a four-stroke internal combustion engine as claimed in claim 1 wherein supplying at least a portion of a total combustion cycle fuel requirement into said elevated combustion chamber temperature and pressure conditions when engine operation is below said predetermined part load operating point further comprises:
  during intermediate part load engine operation, initiating a first injection of fuel into the combustion chamber during the exhaust stroke and initiating a second injection of fuel into the combustion chamber during the intake stroke.

12. Method of operating a four-stroke internal combustion engine as claimed in claim 11 wherein said first injection of fuel is retarded as engine load increases.

13. Method of operating a four-stroke internal combustion engine as claimed in claim 11 wherein said second injection of fuel is retarded as engine load increases.

14. Method of operating a four-stroke internal combustion engine as claimed in claim 11 wherein said first and second injections of fuel are retarded as engine load increases.

15. Method of operating a four-stroke internal combustion engine as claimed in claim 1 wherein establishing recirculated combusted gases within the combustion chamber comprises internal combusted gas recirculation.

16. Method of operating a four-stroke internal combustion engine as claimed in claim 15 wherein internal combusted gas recirculation comprises trapping combusted gases within the combustion chamber through early exhaust valve closing.

17. Method of operating a four-stroke internal combustion engine as claimed in claim 15 wherein internal combusted gas recirculation comprises re-breathing into the combustion chamber through the exhaust valve opened during the intake stroke combusted gases expelled into the exhaust passage through the exhaust valve opened during the exhaust stroke.

18. Method of operating a four-stroke internal combustion engine as claimed in claim 15 wherein internal combusted gas recirculation comprises re-breathing into the combustion chamber through the intake valve opened during the intake stroke combusted gases expelled into the intake passage through the intake valve opened during the exhaust stroke.

19. Method of operating a four-stroke internal combustion engine during part load operation, said engine including a variable volume combustion chamber defined by a piston reciprocating within a cylinder between top-dead center and bottom-dead center points, intake and exhaust passages, and intake and exhaust valves controlled during repetitive, sequential exhaust, intake, compression and expansion strokes of said piston comprising:
   providing a negative valve overlap among the exhaust and intake valves when engine operation is below a predetermined part load operating point; and
   re-breathing combusted gases into the combustion chamber during intake strokes when engine operation is above said predetermined part load operating point.

20. Method of operating a four-stroke internal combustion engine as claimed in claim 19 further comprising:
   injecting into the combustion chamber the total combustion cycle fuel requirement during intake strokes when engine operation is above said predetermined part load operating point.

21. Method of operating a four-stroke internal combustion engine as claimed in claim 20 wherein said injection into the combustion chamber is retarded as engine load increases.

22. Method of operating a four-stroke internal combustion engine as claimed in claim 19 further comprising:
   injecting into the combustion chamber at least a portion of a total combustion cycle fuel requirement during said negative valve overlap.

23. Method of operating a four-stroke internal combustion engine as claimed in claim 22 wherein injecting into the combustion chamber at least a portion of a total combustion cycle fuel requirement during said negative valve overlap further comprises:
   during low part load engine operation, initiating a first injection of fuel into the combustion chamber during the exhaust stroke and initiating a second injection of fuel into the combustion chamber during the compression stroke.

24. Method of operating a four-stroke internal combustion engine as claimed in claim 23 wherein said first injection of fuel is retarded as engine load increases.

25. Method of operating a four-stroke internal combustion engine as claimed in claim 23 wherein said second injection of fuel is advanced as engine load increases.

26. Method of operating a four-stroke internal combustion engine as claimed in claim 23 wherein said first injection of fuel is retarded and said second injection of fuel is advanced as engine load increases.

27. Method of operating a four-stroke internal combustion engine during part load operation, said engine including a variable volume combustion chamber defined by a piston reciprocating within a cylinder between top-dead center and bottom-dead center points, intake and exhaust passages, and intake and exhaust valves controlled during repetitive, sequential exhaust, intake, compression and expansion strokes of said piston comprising:
   trapping and re-compressing combusted gases in the combustion chamber when engine operation is below a predetermined part load operating point effective to provide elevated combustion chamber temperature and pressure conditions; and
   establishing recirculated combusted gases within the combustion chamber during intake strokes when engine operation is above said predetermined part load operating point.

28. Method of operating a four-stroke internal combustion engine as claimed in claim 27 wherein establishing recirculated combusted gases comprises external combusted gas recirculation.

29. Method of operating a four-stroke internal combustion engine as claimed in claim 27 wherein establishing recirculated combusted gases within the combustion chamber comprises internal combusted gas recirculation.

30. Method of operating a four-stroke internal combustion engine as claimed in claim 29 wherein internal combusted gas recirculation comprises trapping combusted gases within the combustion chamber through early exhaust valve closing.

31. Method of operating a four-stroke internal combustion engine as claimed in claim 29 wherein internal combusted gas recirculation comprises re-breathing into the combustion chamber through the exhaust valve opened during the intake stroke combusted gases expelled into the exhaust passage through the exhaust valve opened during the exhaust stroke.

32. Method of operating a four-stroke internal combustion engine as claimed in claim 29 wherein internal combusted gas recirculation comprises re-breathing into the combustion chamber through the intake valve opened during the intake stroke combusted gases expelled into the intake passage through the intake valve opened during the exhaust stroke.

* * * * *

UNITED STATES PATENT AND TRADEMARK OFFICE
CERTIFICATE OF CORRECTION

| | |
|---|---|
| PATENT NO. | : 7,021,277 B2 |
| APPLICATION NO. | : 10/899456 |
| DATED | : April 4, 2006 |
| INVENTOR(S) | : Kuo et al. |

Page 1 of 1

It is certified that error appears in the above-identified patent and that said Letters Patent is hereby corrected as shown below:

Column 10, line 60, "Ser. No. 10/889,945" should read -- Ser. No. 10/899,457 --.

Signed and Sealed this

Twenty-sixth Day of June, 2007

JON W. DUDAS
*Director of the United States Patent and Trademark Office*